US 6,594,143 B2

(12) United States Patent
Yano et al.

(10) Patent No.: US 6,594,143 B2
(45) Date of Patent: *Jul. 15, 2003

(54) LIQUID CRYSTAL MODULE MOUNTING STRUCTURE AND MOBILE TERMINAL MOUNTED WITH THE SAME

(75) Inventors: Takakazu Yano, Tokyo (JP); Tomoo Miwa, Tokyo (JP); Yasuhiro Sato, Tokyo (JP); Toshihisa Ogawa, Tokyo (JP); Michiaki Nishiyama, Tokyo (JP); Masatake Baba, Tokyo (JP); Hikaru Okabe, Tokyo (JP); Fumihiko Fujishiro, Tokyo (JP); Katsuhiro Kato, Tokyo (JP); Kazuaki Mikami, Tokyo (JP); Hirokazu Fukuyoshi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,280

(22) Filed: Dec. 13, 1999

(65) Prior Publication Data

US 2002/0064036 A1 May 30, 2002

(30) Foreign Application Priority Data

Dec. 11, 1998 (JP) .......................................... 10-353579

(51) Int. Cl.$^7$ ................................................. H05K 7/00
(52) U.S. Cl. ..................................................... 361/681
(58) Field of Search ........................... 349/58; 361/681, 361/683; 248/917, 921, 560

(56) References Cited

U.S. PATENT DOCUMENTS

| 5,268,816 A | | 12/1993 | Abell, Jr. et al. | |
|---|---|---|---|---|
| 5,486,942 A | * | 1/1996 | Ichikawa et al. | 359/83 |
| 5,535,092 A | * | 7/1996 | Bang | 361/685 |
| 5,959,844 A | * | 9/1999 | Simon et al. | 361/759 |
| 6,002,582 A | * | 12/1999 | Yeager et al. | 361/681 |
| 6,094,340 A | * | 7/2000 | Min | 361/681 |
| 6,101,089 A | * | 8/2000 | Seto et al. | 361/687 |
| 6,130,658 A | * | 10/2000 | Yamamoto et al. | 345/102 |
| 6,151,207 A | * | 11/2000 | Kim | 361/681 |
| 6,229,695 B1 | * | 5/2001 | Moon | 361/683 |
| 6,252,768 B1 | * | 6/2001 | Lin | 361/687 |
| 6,262,883 B1 | * | 7/2001 | Kim | 361/680 |
| 6,272,006 B1 | * | 8/2001 | Lee | 361/681 |
| 6,276,655 B1 | * | 8/2001 | Byoun | 248/923 |
| 6,297,955 B1 | * | 10/2001 | Frank, Jr. et al. | 361/686 |
| 6,310,767 B1 | * | 10/2001 | Spear et al. | 361/681 |

FOREIGN PATENT DOCUMENTS

| JP | 63-11620 | 1/1988 |
|---|---|---|
| JP | 4-51595 | 2/1992 |
| JP | 4-55619 | 5/1992 |
| JP | 4-331976 | 11/1992 |
| JP | 4-359221 | 12/1992 |

(List continued on next page.)

OTHER PUBLICATIONS

Korean Office Action dated Jan. 30, 2003, with Japanese and partial English translations.

*Primary Examiner*—Lynn D. Feild
*Assistant Examiner*—Thanh-Tam Le
(74) *Attorney, Agent, or Firm*—McGinn & Gibb, PLLC

(57) ABSTRACT

The present invention provides a mounting structure for mounting a liquid crystal module having a display area. The mounting structure comprises: at least a frame member having a plurality of connecting members for connecting the frame member to the liquid crystal module substantially in parallel to each other, wherein each of the connecting members extends between the liquid crystal module and the frame member in a direction vertical to a surface of the frame member.

3 Claims, 25 Drawing Sheets

FOREIGN PATENT DOCUMENTS

| | | |
|---|---|---|
| JP | 5-53099 | 3/1993 |
| JP | 5-150224 | 6/1993 |
| JP | 5-150225 | 6/1993 |
| JP | 8-114788 | 5/1996 |
| JP | 8-179288 | 7/1996 |
| JP | 8-179699 | 7/1996 |
| JP | 8-211964 | 8/1996 |
| JP | 8-314389 | 11/1996 |
| JP | 9-113880 | 5/1997 |
| JP | 9-146466 | 6/1997 |
| JP | 9-292934 | 11/1997 |
| JP | 3051488 | 6/1998 |
| JP | 10-268272 | 10/1998 |
| JP | 10-301095 | 11/1998 |
| JP | 11-85319 | 3/1999 |
| KR | 0124408 | 6/1998 |
| KR | 1999-0066163 | 8/1999 |

\* cited by examiner

LIQUID CRYSTAL MODULE MOUNTING STRUCTURE AND MOBILE TERMINAL MOUNTED WITH THE SAME

BACKGROUND OF THE INVENTION

The present invention relates to a liquid crystal module mounting structure, and more particularly to a structure for mounting a liquid crystal module serving as a display to a mobile terminal such as a note type personal computer.

A liquid crystal module mounted to a note type personal computer will be described. FIG. 1 is a perspective view illustrative of a note type personal computer mounted with a liquid crystal module serving as a display. The note type personal computer comprises a body 202 and a cover 203, A liquid crystal module 200 serving as a display of the computer is mounted to the cover 203. The liquid crystal module 200 has a peripheral region surrounding a display area, and this peripheral region has a plurality of screw holes 201. The cover 203 also has screw holes 205 at positions corresponding to the screw holes 201 of the liquid crystal module 200. The liquid crystal module 200 is fixed to the cover 203 by screws 204 which are driven tightly into the screw holes 201 and the screw holes 205. The display area of the liquid crystal module 200 is smaller in size than an entire part of the liquid crystal module 200 by the peripheral region on which the screw holes 201 are formed. Namely, it is difficult to enlarge the display area of the liquid crystal module 200 without enlargement of the cover 203.

Further, a thickness of the liquid crystal module 200 is decided dependent upon the necessary length of the screws 201 on the basis of the necessary strength in tightly fixing the liquid crystal module 200 to the cover 203. Namely, it is difficult to reduce the thickness of the liquid crystal module 200 with keeping the necessary fixing strength.

In order to have solved the above problems with the conventional liquid crystal module mounting structure of FIG. 1, a side mount type liquid crystal module has been proposed. FIG. 2 is a perspective view illustrative of decomposed side mount type liquid crystal module mounting structure. A liquid crystal module 301 has two opposite side faces which are vertical to a display surface 301a of the liquid crystal module 301. Each of the two opposite side faces has two screw holes 300 which axes are parallel to the display surface 301a. The liquid crystal module 301 is engaged within inside walls of a bottom frame 303. The bottom frame 303 has two opposite side faces, each of which has two screw holes 304 at positions corresponding to the screw holes 300 of the liquid crystal module 301. The liquid crystal module 301 is engaged within the bottom frame 303, whereby the screw holes 300 of the liquid crystal module 301 are aligned to the corresponding screw holes 304 of the bottom frame 303. Screws 305 are driven tightly into the screw holes 300 and the screw holes 304, so as to tightly fix the liquid crystal module 301 to the bottom frame 303. A top frame 302 is placed on the bottom frame 303.

The above side mount type liquid crystal module has the following disadvantage. FIG. 3 is a fragmentary cross sectional elevation view illustrative of a mounting structure of a side mount type liquid crystal module to an outside frame. A liquid crystal module 303 is engaged within an outside frame 303b, wherein a distance "d" is present between an inside wall of the outside frame 303b and a side face of a back-light portion 303c of the liquid crystal module 303, so that a screw 305 is driven into screw holes to penetrate the outside frame 303b and enters into the side portion of the liquid crystal module 303. The distance "d" is necessary as a margin for driving the screw 305. This distance "d" as the screw margin results in widening the liquid crystal module 303.

FIG. 4 is a fragmentary cross sectional elevation view illustrative of a side portion having a screw hole of an outside frame shown in FIG. 3. In view of securing a sufficient strength, a screw hole formation region for forming a screw hole for a screw 305 is made of a metal material, which is heavy more than a resin of a body of the outside frame 303b. The metal screw hole formation region of the outside frame 303b results in increase in weight of the mobile terminal.

With reference back to FIG. 3, a head of the screw 305 projects from the side face of the outside frame 303b in a horizontal direction or a width direction, whereby a distance or margin "s" is present between the head of the screw 305 and the side face of the back-light portion 303c of the liquid crystal module 303. This distance or margin "s" widens the width of the liquid crystal module 303, whereby the width of the mobile terminal is also widen.

Furthermore, a display area of the display surface of the liquid crystal module is smaller than the area of the cover of the mobile terminal by the length of the screw extending in the parallel direction to the display surface of the liquid crystal module.

Moreover as shown in FIG. 4, the screw formation region for forming the screw hole has a side or dimension "D" which is defined by a sum of a diameter "r" of the screw 305, and first and second margins "m1" and "m2", for which reason a reduction in thickness of the liquid crystal module is limited by the dimension "D".

The above described side mount liquid crystal module has a further disadvantage that if the mobile terminal mounted with the side mount liquid crystal module receives an external shock, then a mechanical stress due to the received shock is concentrated to the screw formation region of the outside frame. This mechanical stress concentration may provide damages to the liquid crystal panel and the outside frame.

As described above, the screw formation region of the outside frame is made of a metal material, for which reason when the screw is driven through the screw hole in the screw formation region made of the metal material, then it is possible that a metal broken piece is generated, whereby the metal broken piece may form a short circuit on an electronic circuit.

The above screw formation region of the side mount type liquid crystal module is required to be formed to avoid a driver IC provided on the module. This means that a freedom in design of signal lines of the driver IC is reduced. The screw formation region of the side mount type liquid crystal module makes it difficult to obtain an optimum layout of the signal lines of the driver IC.

The cover of the mobile terminal has the screw receiving portion for receiving the screw, for which reason a slide mold is necessary to form the cover. This means that the cost for forming the manufacturing line is high.

The screw receiving portion of the cover comprises a recessed portion which extends from the side face to an inside portion of the cover. The extension of the recessed portion as the screw receiving portion makes widen the width of the cover.

The side mount type liquid crystal module is inconvenient in removing the liquid crystal module from the cover by removing the screws in side direction.

The screw receiving portions are provided on side portions of the cover, for which reason the screw hole formation region is required to have a high strength by use of a high strength metal such as Mg allow which is, however, expensive and heavy and has a low formability.

In the above circumstances, it had been required to develop a novel liquid crystal module mounting structure for a mobile terminal free from the above problem.

SUMMARY OF THE INVENTION

Accordingly, it is an object of the present invention to provide a novel liquid crystal module mounting structure free from the above problems.

It is a further object of the present invention to provide a novel liquid crystal module mounting structure which allows a reduction in thickness of a liquid crystal module mounted on a mobile terminal.

It is a still further object of the present invention to provide a novel liquid crystal module mounting structure which improves a reliability.

It is yet a further object of the present invention to provide a novel liquid crystal module mounting structure which allows an increased ratio in area of a display area of the liquid crystal module to a cover on which the liquid crystal module is mounted.

It is a further more object of the present invention to provide a novel liquid crystal module mounting structure which is convenient for attachment of the liquid crystal module to a mobile terminal.

It is moreover object of the present invention to provide a novel liquid crystal module mounting structure which is convenient for removal of the liquid crystal module from a mobile terminal.

It is another object of the present invention to provide a novel mobile terminal mounted with a liquid crystal module by an improved liquid crystal module mounting structure free from the above problems.

It is further another object of the present invention to provide a novel mobile terminal mounted with a liquid crystal module by an improved liquid crystal module mounting structure which allows a reduction in thickness of a liquid crystal module mounted on a mobile terminal.

It is still another object of the present invention to provide a novel mobile terminal mounted with a liquid crystal module by an improved liquid crystal module mounting structure which improves a reliability.

It is yet another object of the present invention to provide a novel mobile terminal mounted with a liquid crystal module by an improved liquid crystal module mounting structure which allows an increased ratio in area of a display area of the liquid crystal module to a cover on which the liquid crystal module is mounted.

It is an additional object of the present invention to provide a novel mobile terminal mounted with a liquid crystal module by an improved liquid crystal module mounting structure which is convenient for attachment of the liquid crystal module to a mobile terminal.

It is still additional object of the present invention to provide a novel mobile terminal mounted with a liquid crystal module by an improved liquid crystal module mounting structure which is convenient for removal of the liquid crystal module from a mobile terminal.

The present invention provides a mounting structure for mounting a liquid crystal module having a display area. The mounting structure comprises: at least a frame member having a plurality of connecting members for connecting the frame member to the liquid crystal module substantially in parallel to each other, wherein each of the connecting members extends between the liquid crystal module and the frame member in a direction vertical to a surface of the frame member.

The second present invention provides a cover for a device, the cover has a display device which comprising a liquid crystal module mounted on a frame member by a mounting structure of the first present invention.

The third present invention provides a mobile terminal comprising a body and a cover of the second present invention.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
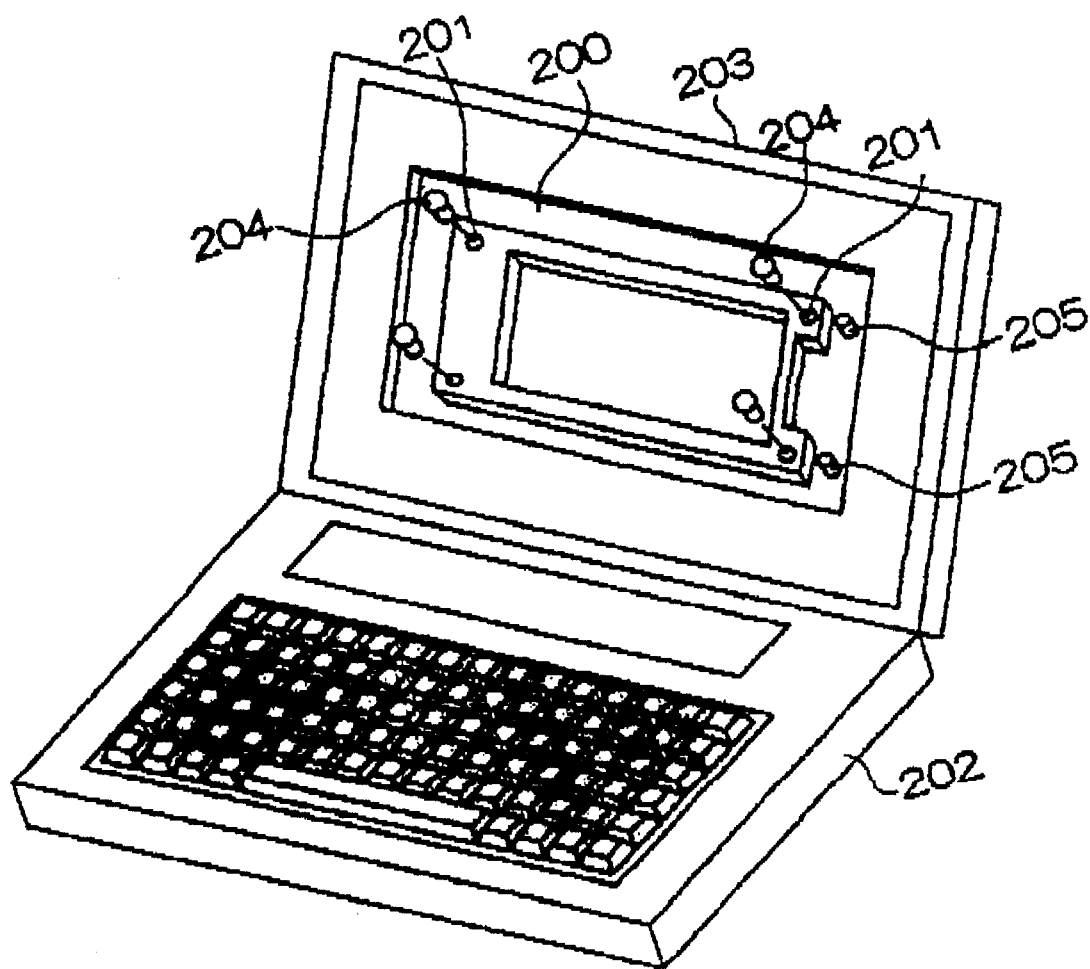
FIG. 1 is a perspective view illustrative of a note type personal computer mounted with a liquid crystal module serving as a display.
Figure 2:
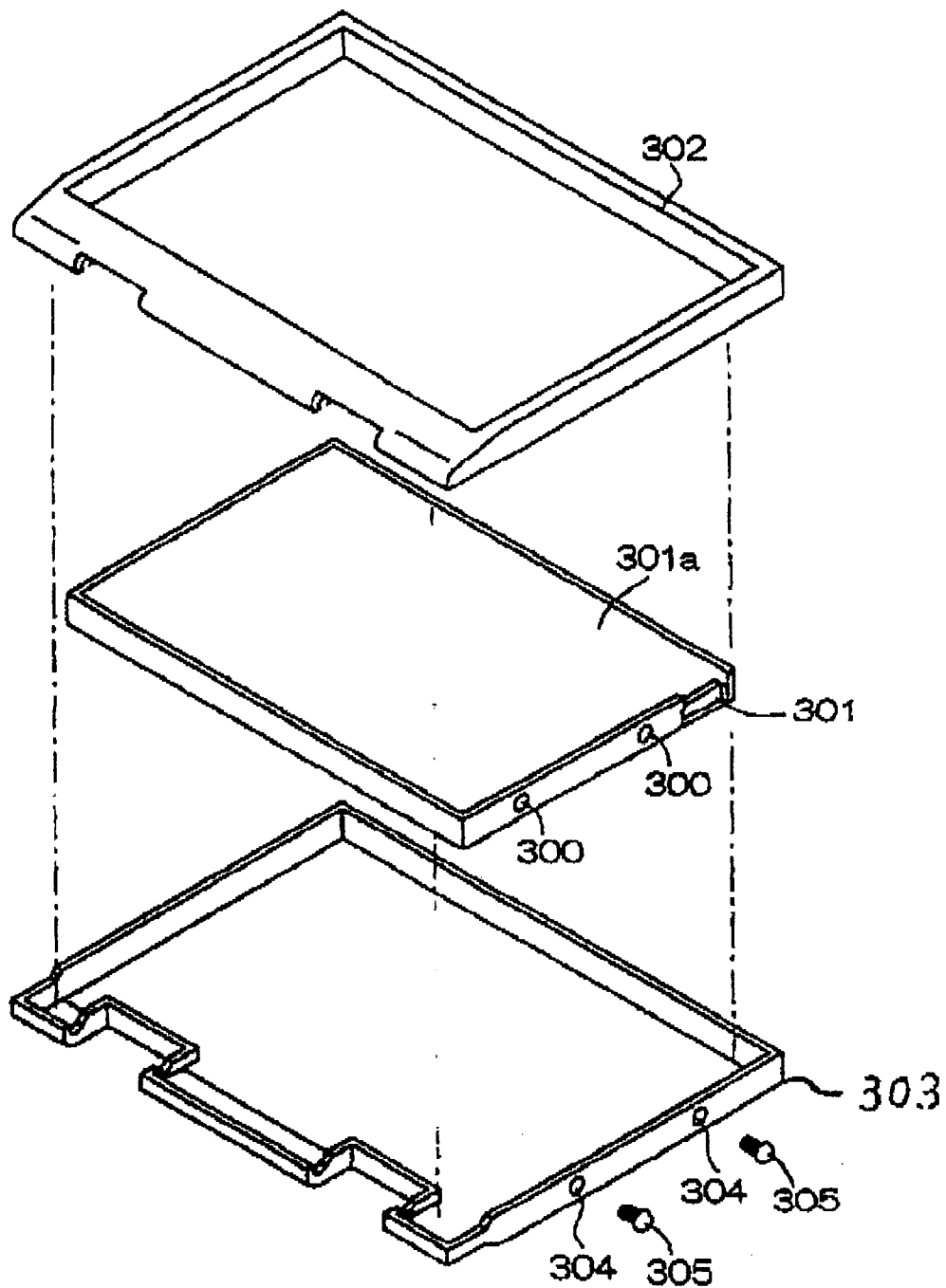
FIG. 2 is a perspective view of decomposed side mount type liquid crystal module mounting structure.
Figure 3:
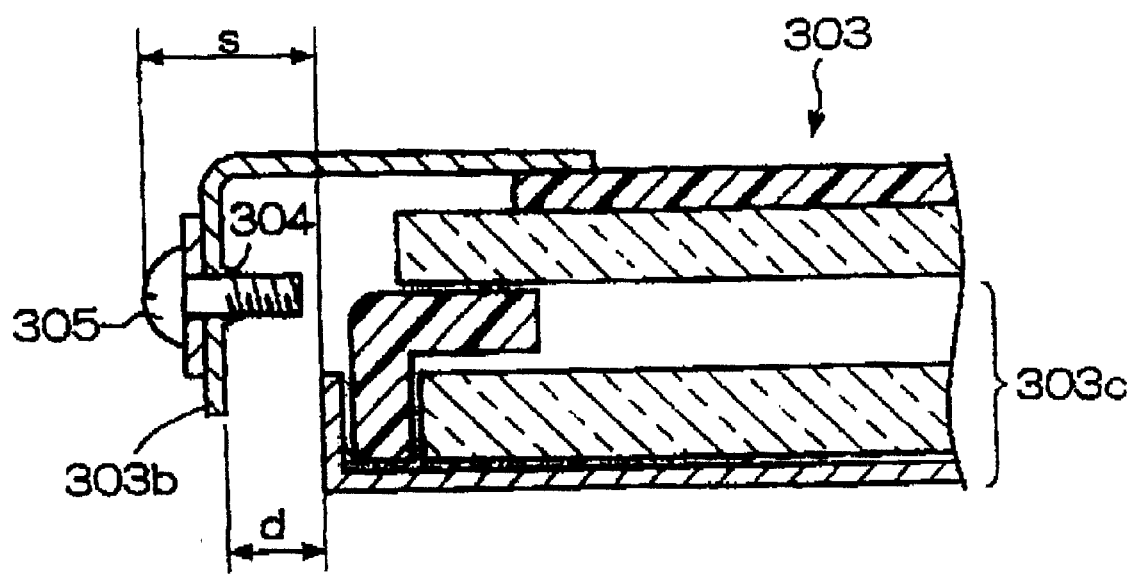
FIG. 3 is a fragmentary cross sectional elevation view illustrative of a mounting structure of a side mount type liquid crystal module to an outside frame.
Figure 4:
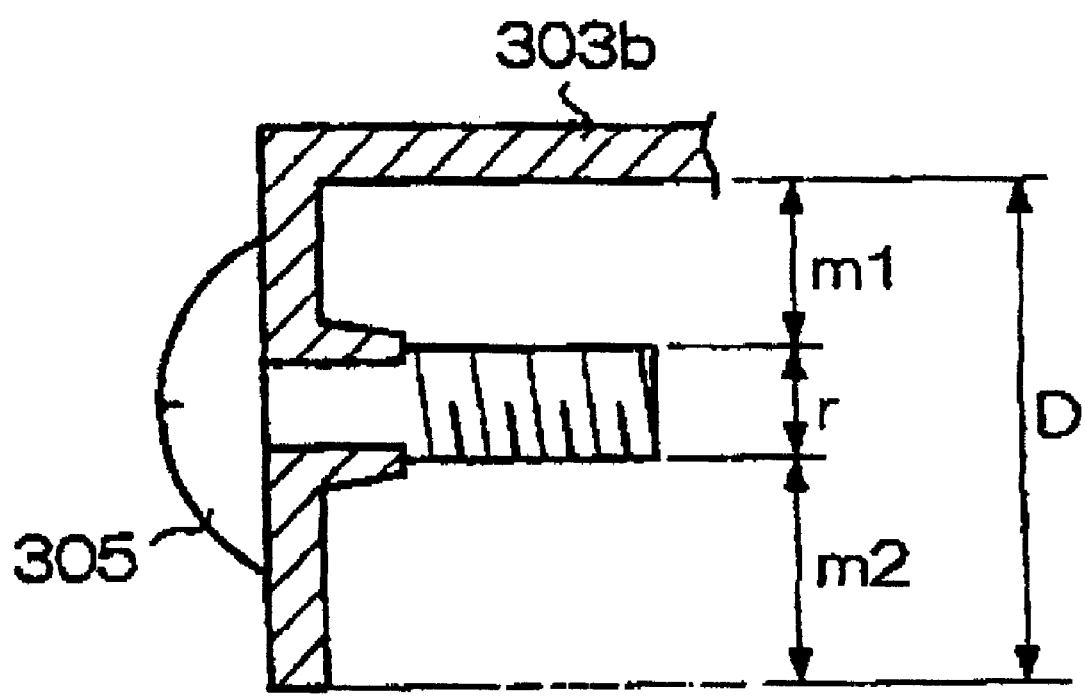
FIG. 4 is a fragmentary cross sectional elevation view illustrative of a side portion having a screw hole of an outside frame shown in FIG. 3.

The present invention provides a mounting structure for mounting a liquid crystal module having a display area. The mounting structure comprises: at least a frame member having a plurality of connecting members for connecting the frame member to the liquid crystal module substantially in parallel to each other, wherein each of the connecting members extends between the liquid crystal module and the frame member in a direction vertical to a surface of the frame member.

It is preferable that the plurality of connecting members are in contact with dead spaces of the liquid crystal module.

It is further preferable that the connecting members comprise plural sets of a screw, a boss formed on the frame member, and a screw hole formed on the liquid crystal module at its position corresponding to the boss.

It is further more preferable that the connecting members further comprise at least a fixing member provided on the frame member and the at least fixing member has a grooved portion which receives one side edge of the liquid crystal module.

It is moreover preferable that the at least fixing member comprises a single fixing member which extends along the one side edge of the liquid crystal module.

It is also preferable that the at least fixing member comprises a plurality of fixing members which are provided separately and distanced along the one side edge of the liquid crystal module.

It is also preferable that the connecting members comprise plural sets of a screw, a boss formed on the frame member, a metal plate having a screw hole aligned to the boss, and a screw hole formed on the liquid crystal module at its position corresponding to the boss.

It is further preferable that the connecting members further comprise at least a fixing member provided on the frame member and the at least fixing member has a grooved portion which receives one side edge of the liquid crystal module.

It is further more preferable that the at least fixing member comprises a single fixing member which extends along the one side edge of the liquid crystal module.

It is also preferable that the at least fixing member comprises a plurality of fixing members which are provided separately and distanced along the one side edge of the liquid crystal module.

It is also preferable that the liquid crystal module is sandwiched between first and second frame members which are also fixed to each other via the plurality of connecting members.

It is also preferable that the connecting members comprise plural sets of a screw, a boss formed on the first frame member, a first screw hole formed on the liquid crystal module at its position corresponding to the boss and a second screw hole formed on the second frame member at its position corresponding to the first screw hole.

It is further preferable that the connecting members further comprise at least a fixing member provided on the fist frame member and the at least fixing member has a grooved portion which receives one side edge of the liquid crystal module.

It is further more preferable that the at least fixing member comprises a single fixing member which extends along the one side edge of the liquid crystal module.

It is also preferable that the at least fixing member comprises a plurality of fixing members which are provided separately and distanced along the one side edge of the liquid crystal module.

It is also preferable that the connecting members comprise plural sets of a screw, a boss formed on the first frame member, a metal plate having a screw hole aligned to the boss, and a first screw hole formed on the liquid crystal module at its position corresponding to the boss and a second screw hole formed on the second frame at its position corresponding to the first screw hole.

It is further preferable that the connecting members further comprise at least a fixing member provided on the first frame member and the at least fixing member has a grooved portion which receives one side edge of the liquid crystal module.

It is further more preferable that the at least fixing member comprises a single fixing member which extends along the one side edge of the liquid crystal module.

It is further preferable that the at least fixing member comprises a plurality of fixing members which are provided separately and distanced along the one side edge of the liquid crystal module.

It is also preferable that the connecting members comprise a plurality of ribs provided along a peripheral of the first frame member, and a plurality of contact regions along a peripheral of the liquid crystal module at corresponding positions to the ribs, so that the contact regions are in contact with the ribs.

It is farther preferable that the first frame and the second frame members have paired connecting parts which connect the first frame member to the second frame member, so that the liquid crystal module is sandwiched between the first frame member and the second frame member, and the contact regions are in contact with the ribs.

It is also preferable that the connecting members further comprise plural sets of a screw, a boss formed on the first frame member, a first screw hole formed on the liquid crystal module at its position corresponding to the boss and a second screw hole formed on the second frame member at its position corresponding to the first screw hole.

It is further preferable that the connecting members further comprise at least a fixing member provided on the first frame member and the at least fixing member has a grooved portion which receives one side edge of the liquid crystal module.

It is further more preferable that the at least fixing member comprises a single fixing member which extends along the one side edge of the liquid crystal module.

It is further preferable that the at least fixing member comprises a plurality of fixing members which are provided separately and distanced along the one side edge of the liquid crystal module.

It is further preferable that the connecting members comprise plural sets of a screw, a boss formed on the first frame member, a metal plate having a screw hole aligned to the boss, and a first screw hole formed on the liquid crystal module at its position corresponding to the boss and a second screw hole formed on the second frame at its position corresponding to the first screw hole.

It is moreover preferable that the connecting members further comprise at least a fixing member provided on the first frame member and the at least fixing member has a grooved portion which receives one side edge of the liquid crystal module.

It is further more preferable that the at least fixing member comprises a single fixing member which extends along the one side edge of the liquid crystal module.

It is also preferable that the at least fixing member comprises a plurality of fixing members which are provided separately and distanced along the one side edge of the liquid crystal module.

The second present invention provides a cover for a device, the cover has a display device which comprising a liquid crystal module mounted on a frame member by a mounting structure of the first present invention.

The third present invention provides a mobile terminal comprising a body and a cover of the second present invention.

Preferred Embodiment

First Embodiment

Figure 5:
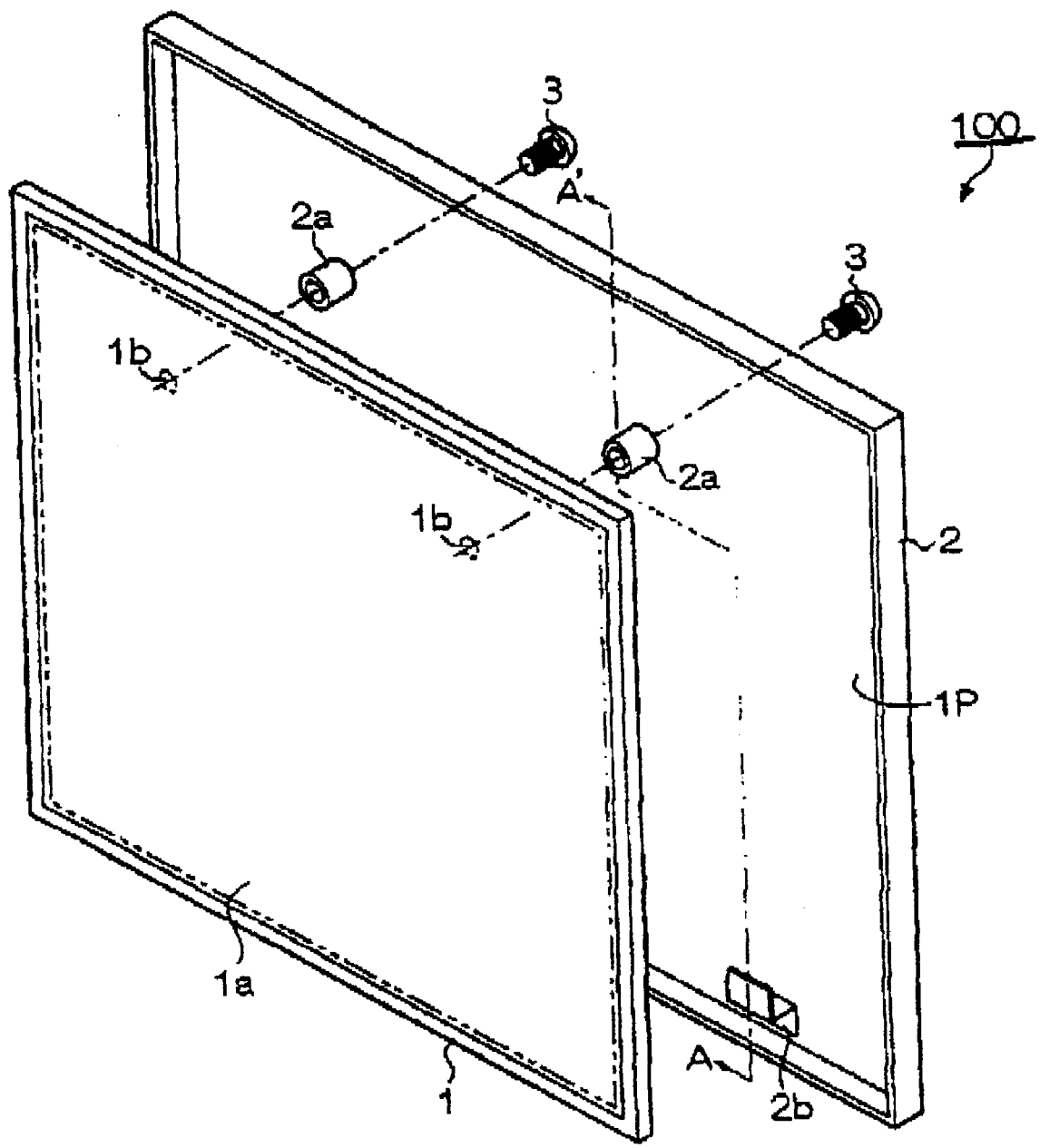
FIG. 5 is a perspective view illustrative of a liquid crystal module mounting structure for mounting a liquid crystal module to a bottom frame of a cover of a personal computer in a first embodiment in accordance with the present invention.

A first embodiment according to the present invention will be described in detail with reference to the drawings. FIG. 5 is a perspective view illustrative of a liquid crystal module mounting structure for mounting a liquid crystal module to a bottom frame of a cover of a personal computer in a first embodiment in accordance with the present invention. A liquid crystal module 1 is mounted to a bottom frame 2 of a cover 10 of a personal computer. The bottom frame 2 has a bottom face 1P which has two bosses 2a which extend in a vertical direction to the bottom face 1P. The liquid crystal module 1 has a display surface 1a. The liquid crystal module 1 has two screw holes 1b at positions corresponding to the bosses 2a of the bottom frame 2. The liquid crystal module 1 is aligned to the bottom frame 2 so that the screw holes 1b of the liquid crystal module 1 correspond in position to the bosses 2a of the bottom frame 2. Screws 3 are driven from an opposite face to the face 1P through the bosses 2a to the screw holes 1b, whereby the liquid crystal module 1 is mounted or fixed to the bottom frame 2.

Figure 6:
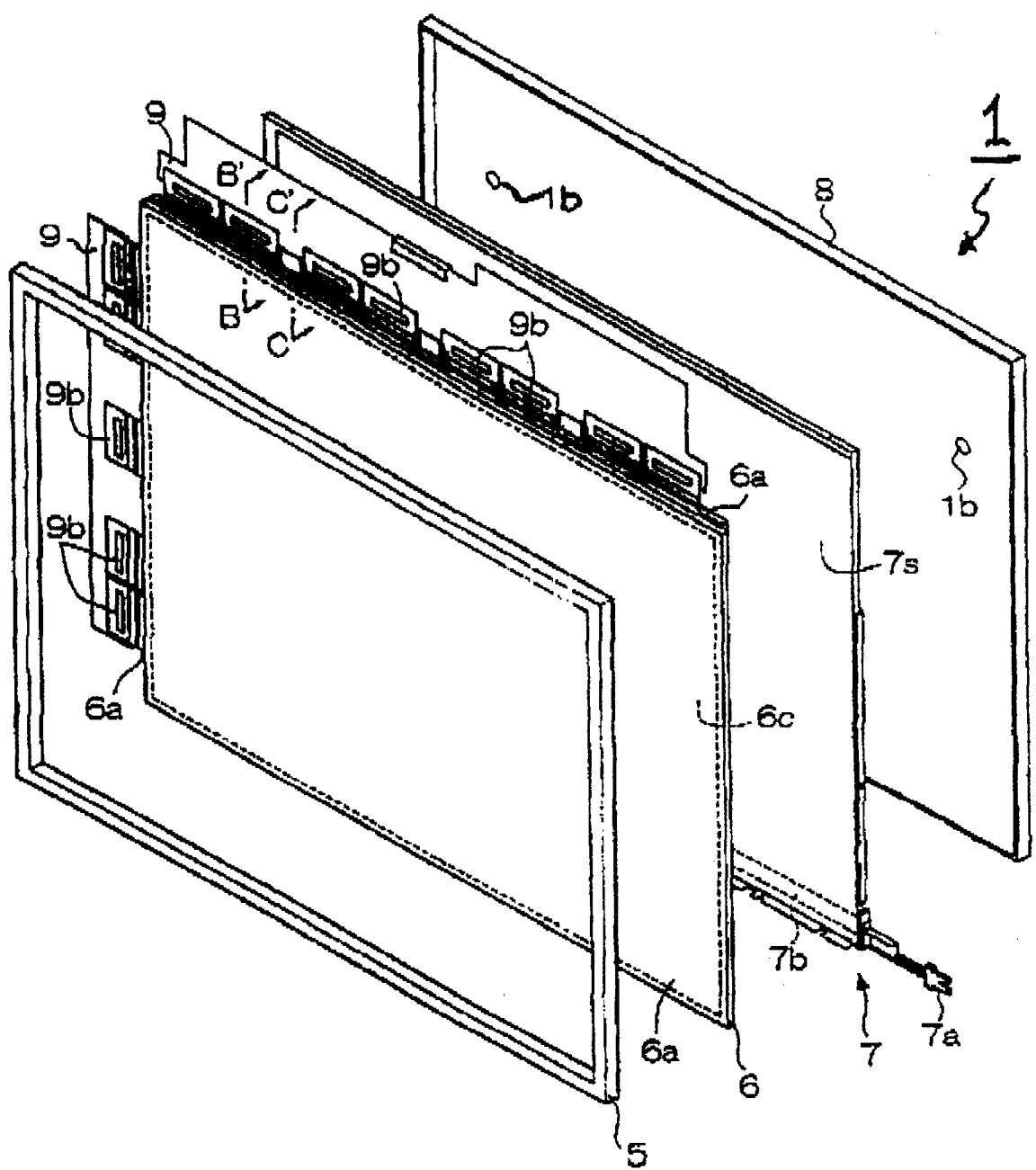
FIG. 6 is a perspective view illustrative of individual components of a liquid crystal module shown in FIG. 5 in a first embodiment in accordance with the present invention.

FIG. 6 is a perspective view illustrative of individual components of a liquid crystal module shown in FIG. 5. The liquid crystal module 1 comprises a front frame 5, a liquid crystal display panel 6, a back-light unit 7 and a back frame 8. The liquid crystal display panel 6 and the back-light unit 7 are laminated to each other so that laminations of the liquid crystal display panel 6 and the back-light unit 7 are sandwiched between the front frame 5 and the back frame 8. The back frame 8 has the two screw holes 1b into which the screws are driven through the bosses of the bottom frame 2. The liquid crystal display panel 6 is provided with a printed circuit board 9 having a driver circuit 9b. The driver circuit 9b of the printed circuit board 9 is electrically connected through a flexible wiring board 6a to the liquid crystal display panel 6, so that the driver circuit 9b of the printed circuit board 9 generates control signals on the basis of image data entered form an external device and the control signals are then transmitted through the flexible wiring board 6a to the liquid crystal display panel 6, whereby the liquid crystal display panel 6 controls liquid crystal cells in accordance with the control signals. The back-light unit 7 accommodates a fluorescent lamp 7b at its right side. The fluorescent lamp 7b turns on a light by a power supplied from a power terminal 7a.

The fluorescent lamp 7b radiates a light which propagates from the top side of the back-light unit 7 to the bottom side thereof. The back-light unit 7 also has a reflective mirror not illustrated. The light radiated from the fluorescent lamp 7b is transmitted with a uniform intensity from a front face 7c of the back-light unit 7 to a back face 6c of the liquid crystal display panel 6, whereby images and characters are displayed on the front face 6b of the liquid crystal display panel 6 with an incident light which has been adjusted in intensity.

For assembling the liquid crystal module, the flexible wiring board 6a is folded and sandwiched between the back-light unit 7 and the back frame 8 to fixe the printed circuit board 9.

With reference back to FIG. 5, the bottom frame 2 has two fixing parts 2b for fixing the liquid crystal module 1 to the bottom frame 2. The shape of the fixing parts 2b may be modified provided the fixing parts 2b are usable for fixing the liquid crystal module 1 to the bottom frame 2.

Figure 7:
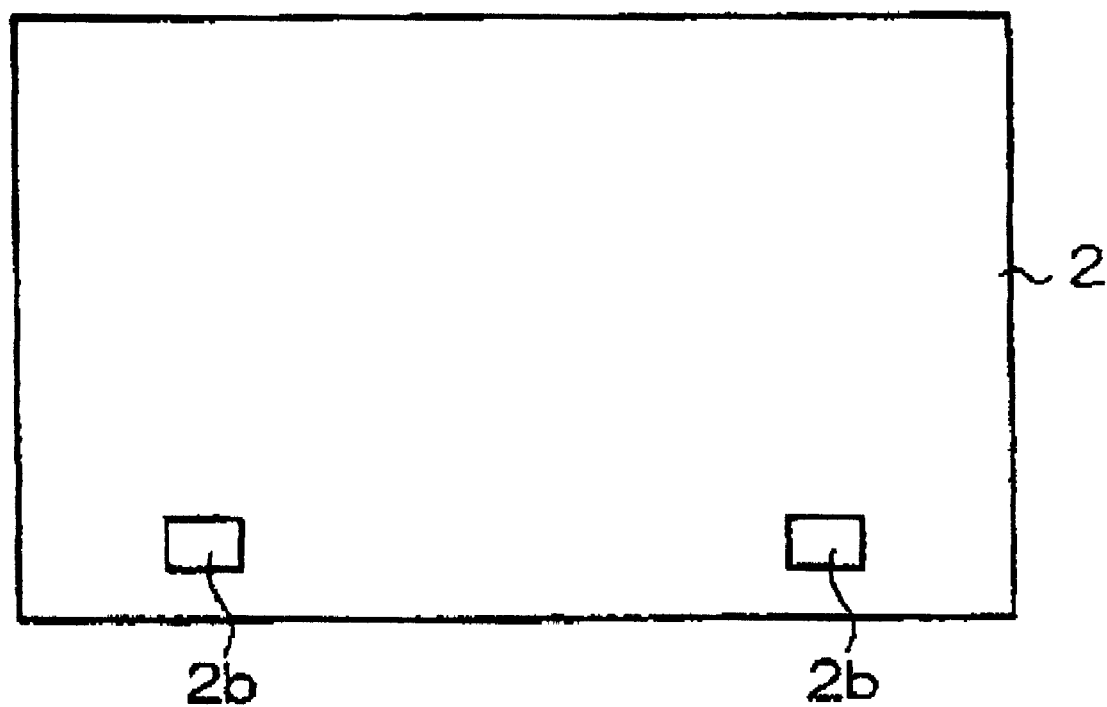
FIG. 7 is a plane view illustrative of the bottom frame with two fixing parts provided separately for fixing the liquid crystal module to the bottom frame shown in FIG. 5.

FIG. 7 is a plane view illustrative of the bottom frame with two fixing parts provided separately for fixing the liquid crystal module to the bottom frame shown in FIG. 5. The fixing parts 2b may be provided separately on a lower region of the bottom frame 2. As a modification, three or more fixing pans 2b may also be provided separately on a lower region of the bottom frame 2.

Figure 8:
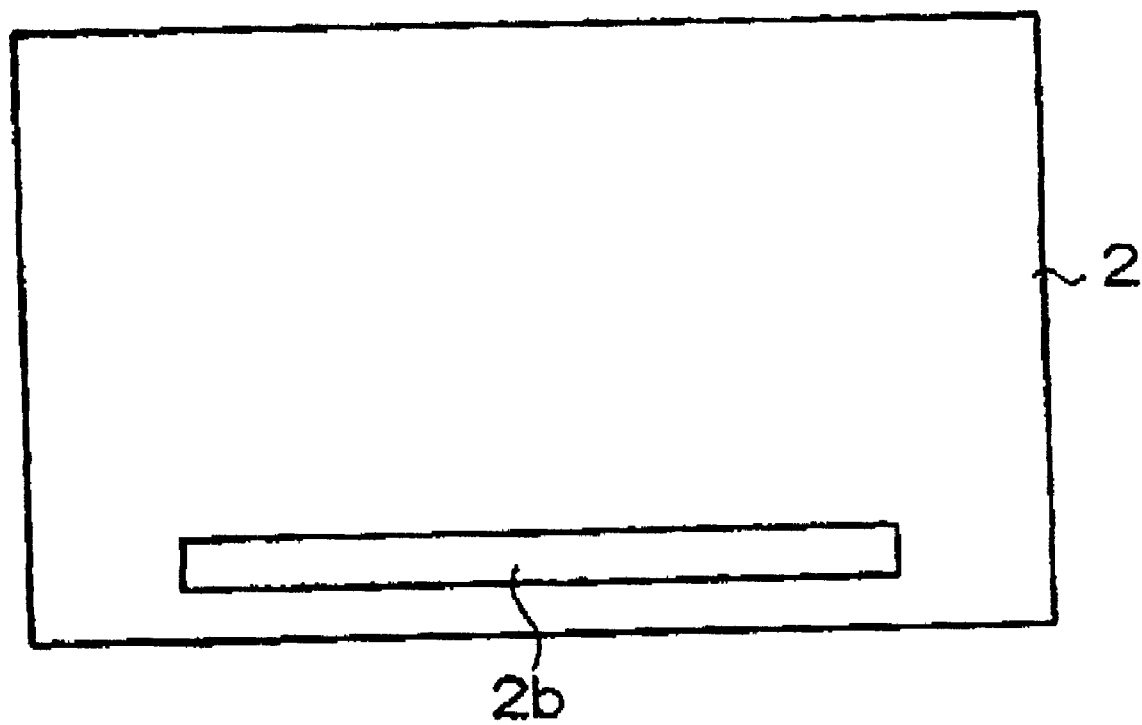
FIG. 8 is a plane view illustrative of the bottom frame with a single fixing part provided for fixing the liquid crystal module to the bottom frame as a modification to the two fixing parts of FIG. 7.

FIG. 8 is a plane view illustrative of the bottom frame with a single fixing part provided for fixing the liquid crystal module to the bottom frame as a modification to the two fixing parts of FIG. 7. The single fixing part 2b may be provided which extends in a horizontal direction parallel to a side of the bottom frame 2.

Figure 9:
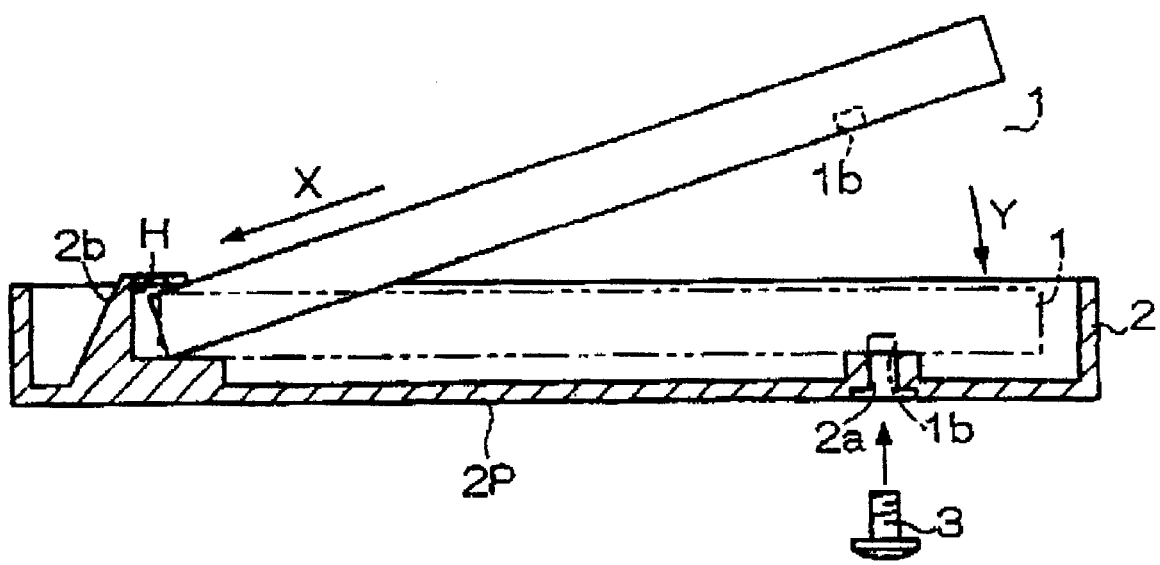
FIG. 9 is a cross sectional elevation view illustrative of a mounting method of mounting a liquid crystal module to a bottom frame shown in FIG. 5 taken along an A–A' line of FIG. 5.

FIG. 9 is a cross sectional elevation view illustrative of a mounting method of mounting a liquid crystal module to a bottom frame shown in FIG. 5 taken along an A–A' line of FIG. 5. The fixing part 2b of the bottom frame 2 comprises a grooved or recessed member, wherein a thickness of the fixing part 2b is reduced toward a front side of the bottom frame 2 so that a front side portion of the bottom frame 2 is so thin as being flexible. The liquid crystal module 1 is moved in an X-direction so that a one side edge of the liquid crystal module 1 is inserted into the groove "H" of the fixing part 2b of the bottom frame 2, before an opposite side edge of the liquid crystal module 1 is moved in a Y-direction so that the liquid crystal module 1 becomes accommodated within the bottom frame 2. The screws 3 are driven through the bosses 2a of the bottom frame 2 to the screw holes 1b, whereby the liquid crystal module 1 is fixed to the bottom frame 2. The cross sectional shape of the fixing part 2b of the bottom frame 2 shown in FIG. 9 is mere one example, and it is of course possible to modify the cross sectional shape of the fixing part 2b.

Figure 10A:
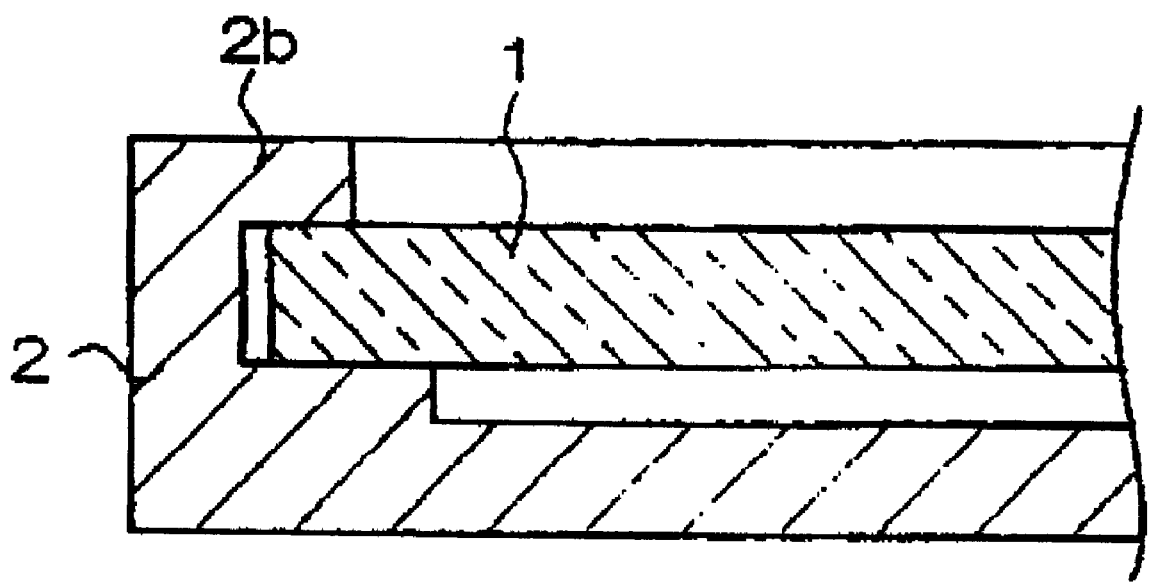
FIG. 10A is a fragmentary cross sectional elevation view illustrative of one side edge of the liquid crystal module and a modified fixing part of the bottom frame.

FIG. 10A is a fragmentary cross sectional elevation view illustrative of one side edge of the liquid crystal module and a modified fixing part of the bottom frame. The fixing part 2b of the bottom frame 2 comprises a grooved or recessed member, wherein a thickness of the fixing part 2b is uniform so that a front side portion of the bottom frame 2 is so thick.

Figure 10B:
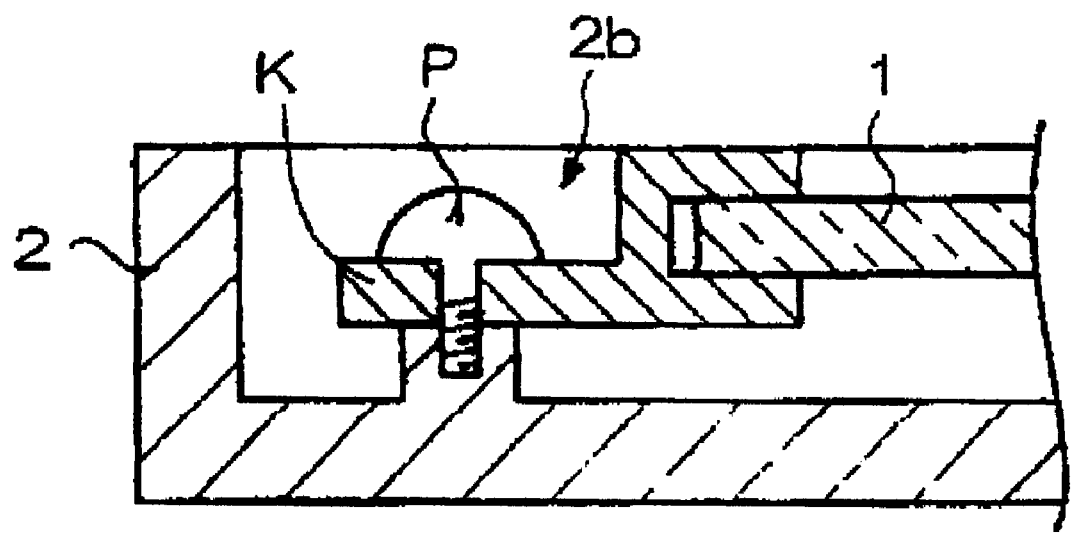
FIG. 10B is a fragmentary cross sectional elevation view illustrative of one side edge of the liquid crystal module and another modified fixing part of the bottom frame.

FIG. 10B is a fragmentary, cross sectional elevation view illustrative of one side edge of the liquid crystal module and another modified fixing part of the bottom frame. The fixing part 2b of the bottom frame 2 comprises a separate metal fitting "K" which has screw holes through which screws "P" are driven into screw holes of the bottom frame 2 so that the separate metal fitting "K" is fixed to the bottom frame 2 by the screws "P". The separate metal fitting "K" has a grooved or recessed portion which receives one side edge of the liquid crystal module 1. A thickness of the separate metal fitting is uniform. The screw holes of the bottom frame 2 are formed in a dead space provided for a hinged portion for mounting a cover 100 to the body of the personal computer Namely, a dead space of the cover is utilized to suppress enlargement in size of the cover.

Figure 10C:
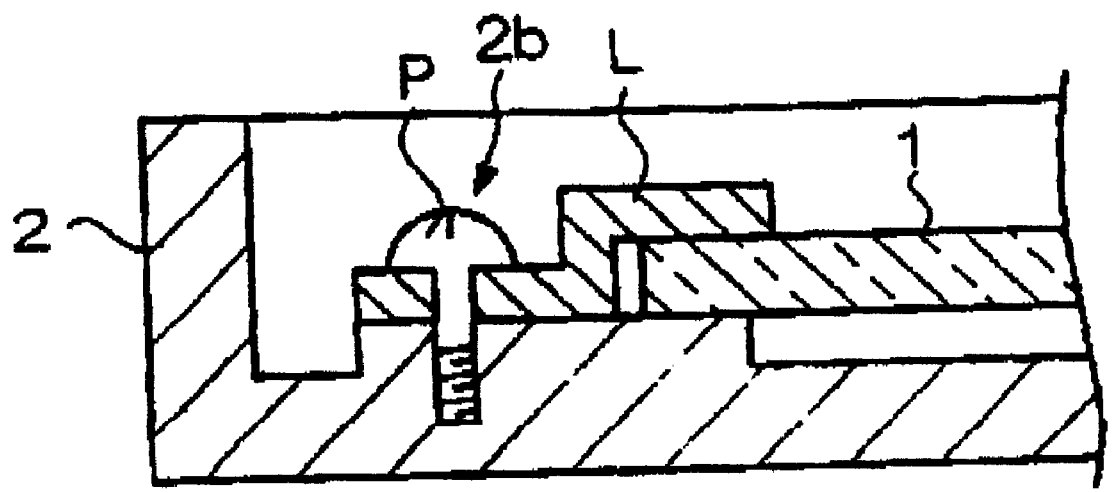
FIG. 10C is a fragmentary cross sectional elevation view illustrative of one side edge of the liquid crystal module and still another modified fixing part of the bottom frame.

FIG. 10C is a fragmentary cross sectional elevation view illustrative of one side edge of the liquid crystal module and still another modified fixing part of the bottom frame. The fixing part 2b of the bottom frame 2 comprises a separate metal fitting "L" which has screw holes through which screws "P" are driven into screw holes of the bottom frame 2 so that the separate metal fitting "L" is fixed to the bottom frame 2 by the screws "P". The separate metal fitting "L" has a L-shaped bent portion which forms a recess or groove together with a ridged portion of the bottom frame 2, wherein a flat portion of the separate metal fitting "L" is fitted with a surface of the ridged portion. The screw holes are formed in the flat portion of the separate metal fitting "L". The recess and groove is formed between the bent portion of the separate metal fitting "L" and the ridged portion of the bottom frame 2. The one side edge of the liquid crystal module 1 is inserted into the recess and groove defied between the bent portion of the separate metal fitting "L" and the ridged portion of the bottom frame 2. A thickness of the separate metal fitting "L" is uniform. The screw holes of the bottom frame 2 are formed in a dead space provided for a hinged portion for mounting a cover 100 to the body of the personal computer. Namely, a dead space of the cover is utilized to suppress enlargement in size of the cover.

Figure 11:
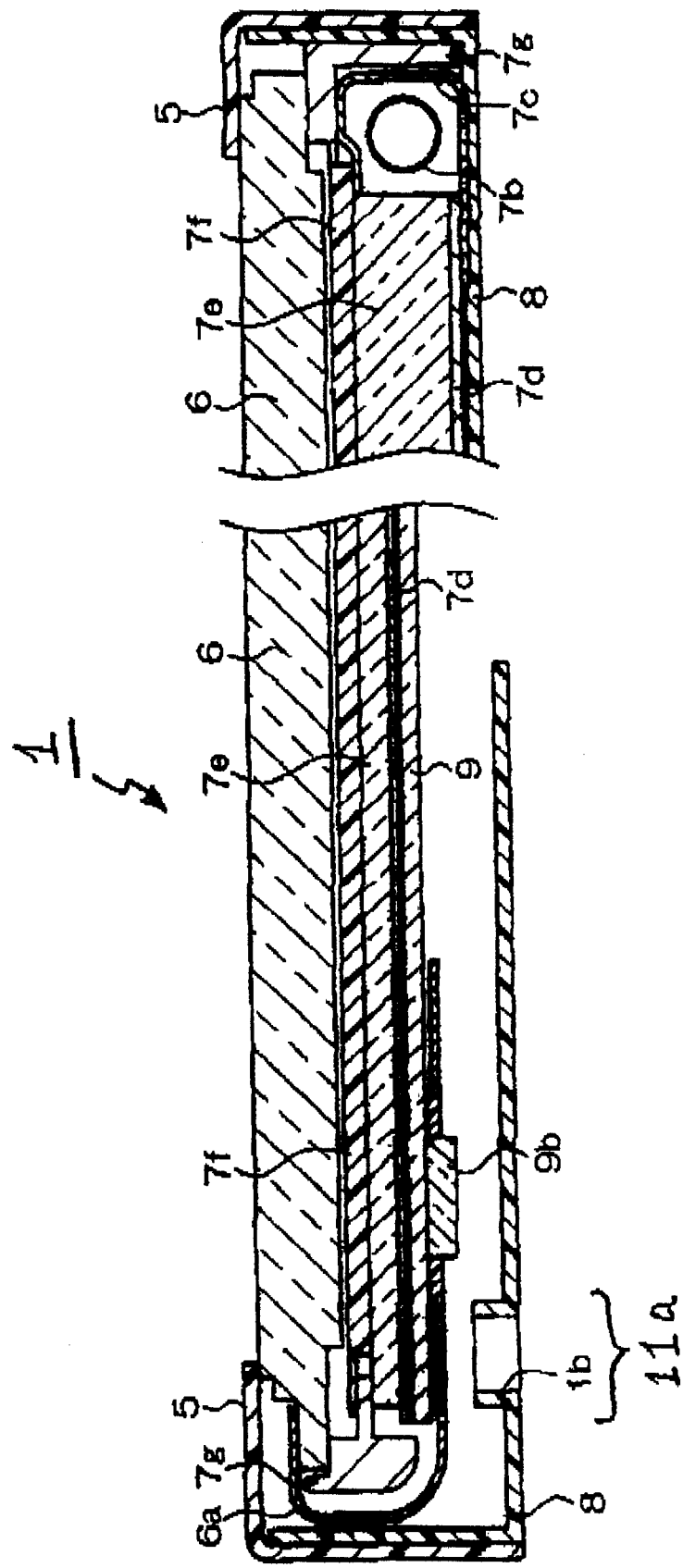
FIG. 11 is a fragmentary cross sectional elevation view illustrative of a liquid crystal module having an internal structure with a liquid crystal driver circuit $9b$ taken along a B–B' line of FIG. 6.
Figure 12:
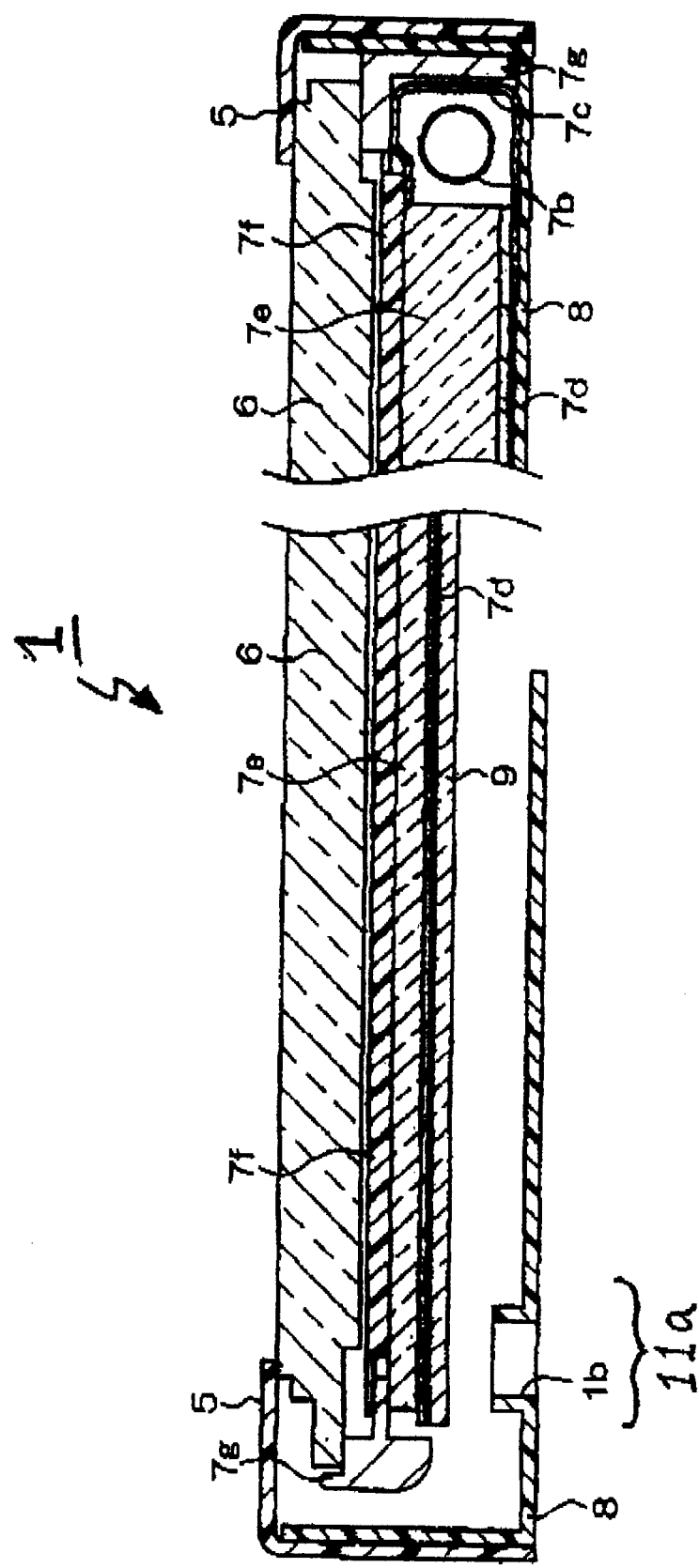
FIG. 12 is a fragmentary cross sectional elevation view illustrative of a liquid crystal module having an internal structure free of a liquid crystal driver circuit 9b taken along a C–C' line of FIG. 6.

FIG. 11 is a fragmentary cross sectional elevation view illustrative of a liquid crystal module having an internal structure with a liquid crystal driver circuit 9b taken along a B–B' line of FIG. 6. FIG. 12 is a fragmentary cross sectional elevation view illustrative of a liquid crystal module having an internal structure free of a liquid crystal driver circuit 9b taken along a C–C' line of FIG. 6. The screw holes 1b may be formed at any positions of the back frame 8 unless heads of the screws are made into contact with internal components of the liquid crystal module 1 such as the board 9 on which the driver circuit 9b is formed. The presence of screw hole formation regions 11a for forming the screw holes 1b does never enlarge in size of the cover 100 and a large ratio in area of the liquid crystal module 1 to the cover 100 may be made larger than the conventional structures described above.

The back-light unit 7 comprises a lamp 7b, a reflector 7c, a reflecting sheet 7d, an optical guide plate 7e, an optical sheet 7f and a mounting frame 7g. The lamp 7b, the reflector 7c, the reflecting sheet 7d, the optical guide plate 7e, and the optical sheet 7f are laminated. One side edge of the laminations is engaged with the mounting frame 7g. The laminations are sandwiched between the front frame 5 and the back frame 8. The reflector 7c is provided for reflecting a light radiated from the lamp 7b to allow the light to propagate toward the optical guide plate 7e.

The optical guide plate 7e has a width defined in a direction parallel to the interfaces of the above laminations, so that the optical guide plate 7e causes a light radiated form the lamp 7b to be diffused. The diffused light is then reflected by the reflecting sheet 7d. The reflected light is transmitted through the optical sheet 7f to the liquid crystal display panel 6. The optical sheet 7f contributes to have the diffused light uniform in brightness.

In accordance with the above first embodiment, the liquid crystal module 1 is fixed to the bottom frame 2 by the above described novel mounting or fixing structure, so that the presence of the screw hole formation regions 11a forming the screw holes 1b does never enlarge in size or area of the cover 100, whereby a large ratio in area of the display surface 1a of the liquid crystal module 1 to the cover 100 may be obtained.

The screws are driven in a direction vertical to the surface of the bottom frame, for which reason it is convenient to attach the liquid crystal module 1 to the bottom frame and also convenient to remove the liquid crystal module 1 from the bottom frame. This makes it easy to assemble the personal computer.

Further, the screw hole formation regions forming the screw holes are positioned in dead spaces of the liquid crystal module so as to provide no influence to the circuits of the liquid crystal module, and the screws are driven in a direction vertical to the surface of the bottom frame, for which reason the thickness of the cover may be decided on the basis of the thickness of the liquid crystal module.

The screws are driven in a direction vertical to the surface of the bottom frame, for which reason a high freedom in layout of wing of the flexible board to the driver circuit 9b mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Second Embodiment

Figure 13:
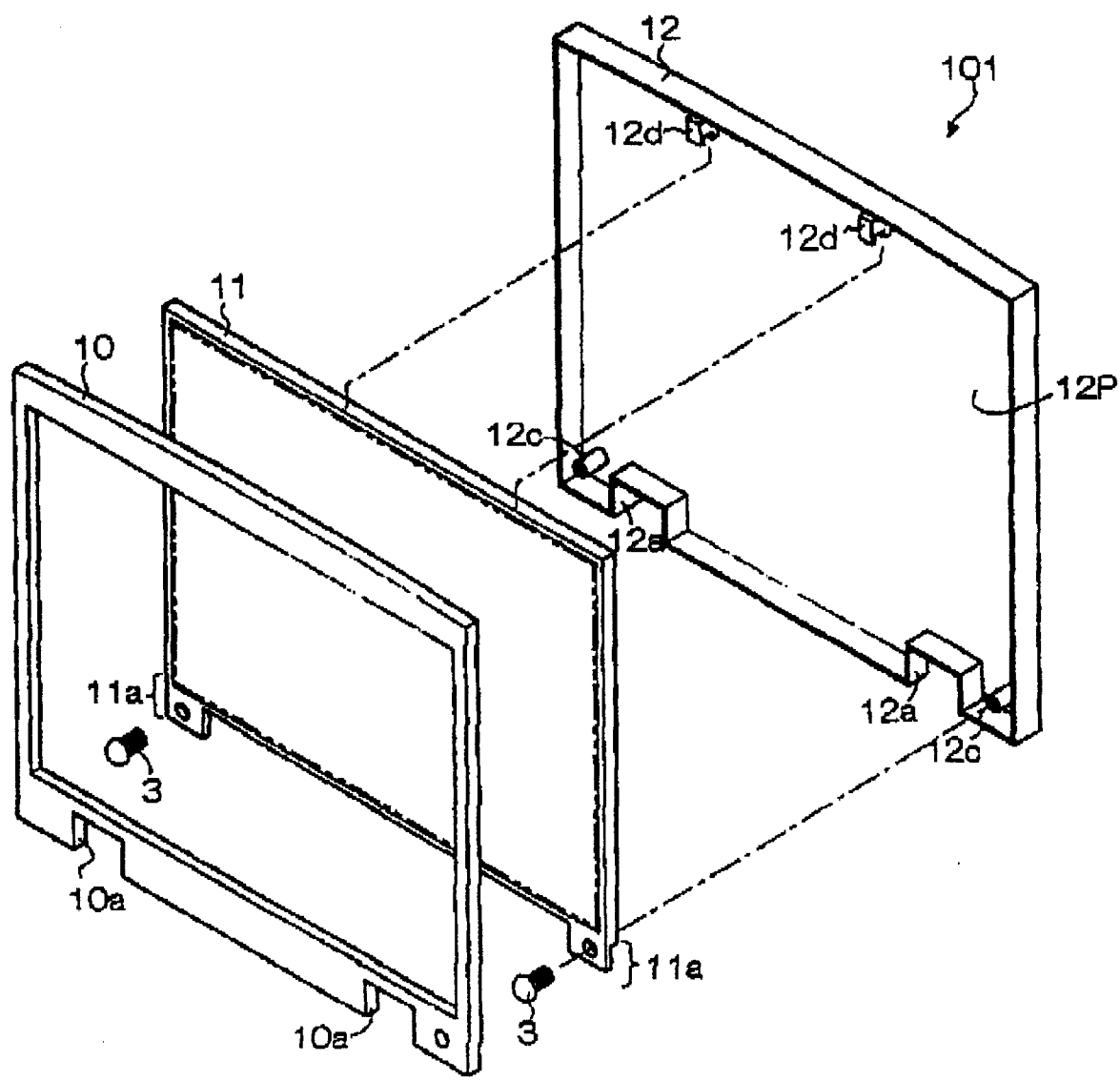
FIG. 13 is a perspective view illustrative of a liquid crystal module mounting structure for mounting a liquid crystal module to a bottom frame of a cover of a personal computer in a second embodiment in accordance with the present invention.

A second embodiment according to the present invention will be described in detail with reference to the drawings. FIG. 13 is a perspective view illustrative of a liquid crystal module mounting structure for mounting a liquid crystal module to a bottom frame of a cover of a personal computer in a second embodiment in accordance with the present invention. A cover 101 of the personal computer comprises a top frame 10, a liquid crystal module 11 and a bottom frame 12. The liquid crystal module 11 is sandwiched between the top frame 10 and the bottom frame 12. The liquid crystal module 11 is mounted to the bottom frame 12. The liquid crystal module 11 has the same structure as shown In FIG. 6 except that the outside frame 5 has two screw hole formation parts 11a which extend from opposite edge portions of a bottom side of the outside frame 5. The detailed descriptions about the structure of the liquid crystal module 11 are eliminated to prevent duplicate descriptions. The top frame 10 has two recessed portions 10a on the bottom side of the top frame 10. The bottom frame 12 has two recessed portions 12a on the bottom side of the bottom frame 12. The recessed portions 10a of the top frame 10 correspond in position to the recessed portions 12a of the bottom frame 12. The bottom frame 2 has a bottom face 12P which has two bosses 12c which extend in a vertical direction to the bottom face 12P. The bottom frame has two fixing parts 12d on the top side of the bottom frame 12. The fixing parts 12 have recessed or grooved portions. The liquid crystal module 11 is aligned to the bottom frame 12 so that the top side of the liquid crystal module 11 comes engaged into the recessed or grooved portions of the fixing parts 12d. Subsequently, the screw holes of the liquid crystal module 11 is aligned to the bosses 12c of the bottom frame 12. Screws 3 are driven in a vertical direction to the surfaces of the bottom frame 12 and the liquid crystal module 11. The screws 3 are thus driven from the screw holes of the liquid crystal module 11 to the bosses 2a to the bottom frame, whereby the liquid crystal module 11 is mounted or fixed to the bottom frame 12. Hinges are attached to the recessed portions 10a of the top frame 10 and also attached to the recessed portions 12a of the bottom frame 12. The top frame 10 is attached to the bottom frame 12, whereby the liquid crystal module 11 is sandwiched between the top frame 10 and the bottom frame 12.

The liquid crystal module 11 is moved in a tilting direction from the surface of the bottom frame 12 so that one side edge of the liquid crystal module 11 is inserted into the grooved portions of the fixing parts 12d of the bottom frame 12. The fixing parts 12d may be any one of various shapes as shown in FIGS. 9 and 10A through 10C. The opposite side of the liquid crystal module 11 to the above one side is moved toward the bottom frame 12 in a direction vertical to the surface of the bottom frame, so that the screw holes of the liquid crystal module 11 come together with the bosses 12c of the bottom frame 12. The screws 3 are driven in the direction vertical to the surface of the liquid crystal module 11 so that the screws 3 come engaged into the screw holes of the liquid crystal module 11 and the bosses 12c, whereby the liquid crystal module 11 is fixed to the bottom frame 12.

The liquid crystal module 11 is fixed to the bottom frame 12 by the above described novel mounting or fixing structure, so that the presence of the screw hole formation regions 11a forming the screw holes does never enlarge in size or area of the cover 101, whereby a large ratio in area of the display surface of the liquid crystal module 11 to the cover 101 may be obtained.

The screws 3 arc driven in a direction vertical to the surface of the bottom frame 12, for which reason it is convenient to attach the liquid crystal module 11 to the bottom frame 12 and also convenient to remove the liquid crystal module 11 from the bottom frame 12. This makes it easy to assemble the personal computer.

Further, the screw hole formation regions 11a forming the screw holes are positioned in dead spaces of the liquid crystal module 11 so as to provide no influence to the circuits of the liquid crystal module 11, and the screws 3 are driven in a direction vertical to the surface of the bottom frame 12, for which reason the thickness of the cover 101 may be decided on the basis of the thickness of the liquid crystal module 11.

The screws 3 are driven in a direction vertical to the surface of the bottom frame 12, for which reason a high freedom in layout of wiring of the flexible board to the driver circuit mounted on the printed circuit board can be obtained.

It is possible to fix the liquid crystal module 11 to the bottom frame 12 with use of only three or more screws 3 which are not aligned on a single straight line, without using the fixing parts 12d.

In accordance with the above second embodiment, the liquid crystal module is fixed to the bottom frame by the above described novel mounting or fixing structure, so that the presence of the screw hole formation regions forming the screw holes 1b does never enlarge in size or area of the cover, whereby a large ratio in area of the display surface of the liquid crystal module to the cover may be obtained.

The screws are driven in a direction vertical to the surface of the bottom frame, for which reason it is convenient to attach the liquid crystal module to the bottom frame and also convenient to remove the liquid crystal module from the bottom frame. This makes it easy to assemble the personal computer.

Further, the screw hole formation regions forming the screw holes are positioned in dead spaces of the liquid crystal module so as to provide no influence to the circuits of the liquid crystal module, and the screws are driven in a direction vertical to the surface of the bottom frame, for which reason the thickness of the cover may be decided on the basis of the thickness of the liquid crystal module.

The screws are driven in a direction vertical to the surface of the bottom frame, for which reason a high freedom in layout of wiring of the flexible board to the driver circuit mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Third Embodiment

Figure 14:
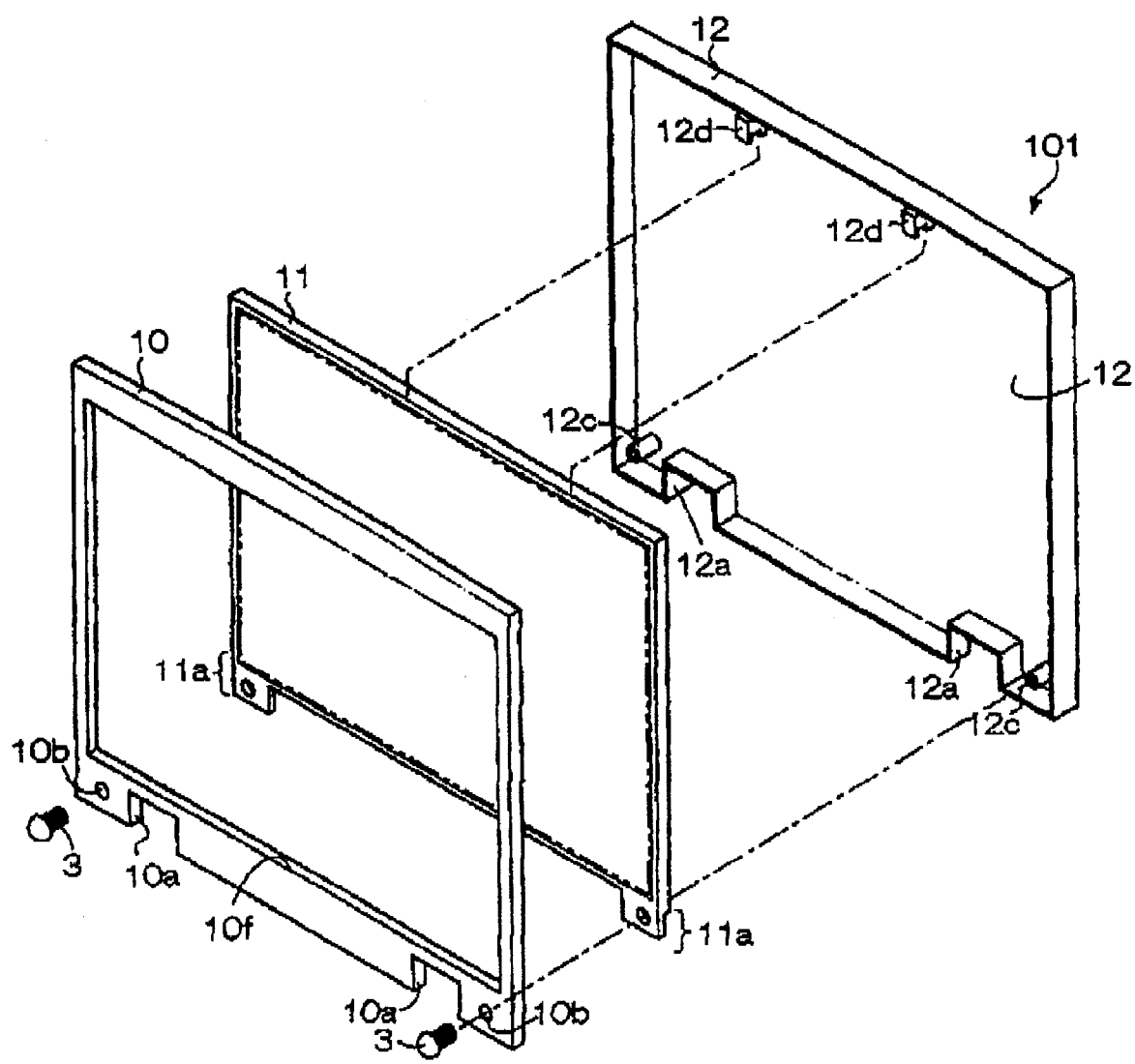
FIG. 14 is a perspective view illustrative of a liquid crystal module mounting structure for mounting a liquid crystal module to a bottom frame of a cover of a personal computer in a third embodiment in accordance with the present invention.

A third embodiment according to the present invention will be described in detail with reference to the drawings. FIG. 14 is a perspective view illustrative of a liquid crystal module mounting structure for mounting a liquid crystal module to a bottom frame of a cover of a personal computer in a third embodiment in accordance with the present invention. A cover 101 of the personal computer comprises a top frame 10, a liquid crystal module 11 and a bottom frame 12. The liquid crystal module 11 is sandwiched between the top frame 10 and the bottom frame 12. The liquid crystal module 11 is mounted to the bottom frame 12. The liquid crystal module 11 has the same structure as shown in FIG. 6 except that the outside frame 5 has two screw hole formation parts 11a which extend from opposite edge portions of a bottom side of the outside frame 5. The detailed descriptions about the structure of the liquid crystal module 11 are eliminated to prevent duplicate descriptions. The top frame 10 has two recessed portions 10a on the bottom side of the top frame 10. The bottom frame 12 has two recessed portions 12a on the bottom side of the bottom frame 12. The recessed portions 10a of the top frame 10 correspond in position to the recessed portions 12a of the bottom frame 12. The bottom frame 2 has a bottom face 12P which has two bosses 12c which extend in a vertical direction to the bottom face 12P. The bottom frame has two fixing parts 12d on the top side of the bottom frame 12. The fixing parts 12 have recessed or grooved portions. The top frame 10 also has two screw holes 10b at corresponding positions to the screw holes of the liquid crystal module 11. The liquid crystal module 11 is aligned to the bottom frame 12 so that the top side of the liquid crystal module 11 comes engaged into the recessed or grooved portions of the fixing parts 12d. Subsequently, the screw holes of the liquid crystal module 11 is aligned to the bosses 12c of the bottom frame 12. Further, the top frame 10 is aligned to the bottom frame 12 so that the screw holes 10b are aligned or correspond to the screw holes of the liquid crystal module 11 and the bosses 12c of the bottom frame 12. Screws 3 are driven in a vertical direction to the surfaces of the top frame, the bottom frame 12 and the liquid crystal module 11, The screws 3 are thus driven from the screw holes 10b of the top frame 10 through the screw holes of the liquid crystal module 11 to the bosses 2a of the bottom frame 12, whereby the liquid crystal module 11 is mounted or fixed to the bottom frame 12 and the top frame 10 is also mounted or fixed to the bottom frame 12. As a result, the liquid crystal module 11 is sandwiched between the bottom frame 12 and the top frame 10.

The liquid crystal module 11 is moved in a tilting direction from the surface of the bottom frame 12 so that one side edge of the liquid crystal module 11 is inserted into the grooved portions of the fixing parts 12d of the bottom frame 12. The fixing parts 12d may be any one of various shapes as shown in FIGS. 9 and 10A through 10C. The opposite side of the liquid crystal module 11 to the above one side is moved toward the bottom frame 12 in a direction vertical to the surface of the bottom frame, so that the screw holes of the liquid crystal module 11 come together with the bosses 12c of the bottom frame 12. The top frame 10 is subsequently aligned to the bottom frame 12 so that the screw holes 10b of the top frame 10 are aligned or correspond to the screw holes of the liquid crystal module 1 and the bosses 12c of the bottom frame 12. The screws 3 are driven in the direction vertical to the surface of the liquid crystal module 11 so that the screws 3 come engaged into the screw hoes 10b of the top frame 10, the screw holes of the liquid crystal module 11 and the bosses 12c of the bottom frame 12, whereby the liquid crystal module 11 is fixed to the bottom frame 12.

The liquid crystal module 11 is fixed to the bottom frame 12 by the above described novel mounting or fixing structure, so that the presence of the screw hole formation regions 11a forming the screw holes does never enlarge in size or area of the cover 101, whereby a large ratio in area of the display surface of the liquid crystal module 11 to the cover 101 may be obtained.

The screws 3 are driven in a direction vertical to the surface of the bottom frame 12, for which reason it is convenient to attach the liquid crystal module 11 to the bottom frame 12 and also convenient to remove the liquid crystal module 11 from the bottom frame 12. This makes it easy to assemble the personal computer.

Further, the screw hole formation regions 11a forming the screw holes are positioned in dead spaces of the liquid crystal module 11 so as to provide no influence to the circuits of the liquid crystal module 11, and the screws 3 are driven in a direction vertical to the surface of the bottom frame 12, for which reason the thickness of the cover 101 may be decided on the basis of the thickness of the liquid crystal module 11.

The screws 3 are driven in a direction vertical to the surface of the bottom frame 12, for which reason a high freedom in layout of wiring of the flexible board to the driver circuit mounted on the printed circuit board can be obtained.

It is possible to fix the liquid crystal module 11 to the bottom frame 12 with use of only three or more screws 3 which are not aligned on a single straight line, without using the fixing parts 12d.

In accordance with the above third embodiment, the liquid crystal module is fixed to the bottom frame by the above described novel mounting or fixing structure, so that the presence of the screw hole formation regions forming the screw holes does never enlarge in size or area of the cover, whereby a large ratio in area of the display surface of the liquid crystal module to the cover may be obtained.

The screws are driven in a direction vertical to the surface of the bottom frame, for which reason it is convenient to attach the liquid crystal module to the bottom frame and also convenient to remove the liquid crystal module from the bottom frame. This makes it easy to assemble the personal computer.

Further, the screw hole formation regions forming the screw holes are positioned in dead spaces of the liquid crystal module so as to provide no influence to the circuits of the liquid crystal module, and the screws are driven in a direction vertical to the surface of the bottom frame, for which reason the thickness of the cover may be decided on the basis of the thickness of the liquid crystal module.

The screws are driven in a direction vertical to the surface of the bottom frame, for which reason a high freedom in layout of wiring of the flexible board to the driver circuit mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Fourth Embodiment

Figure 15:
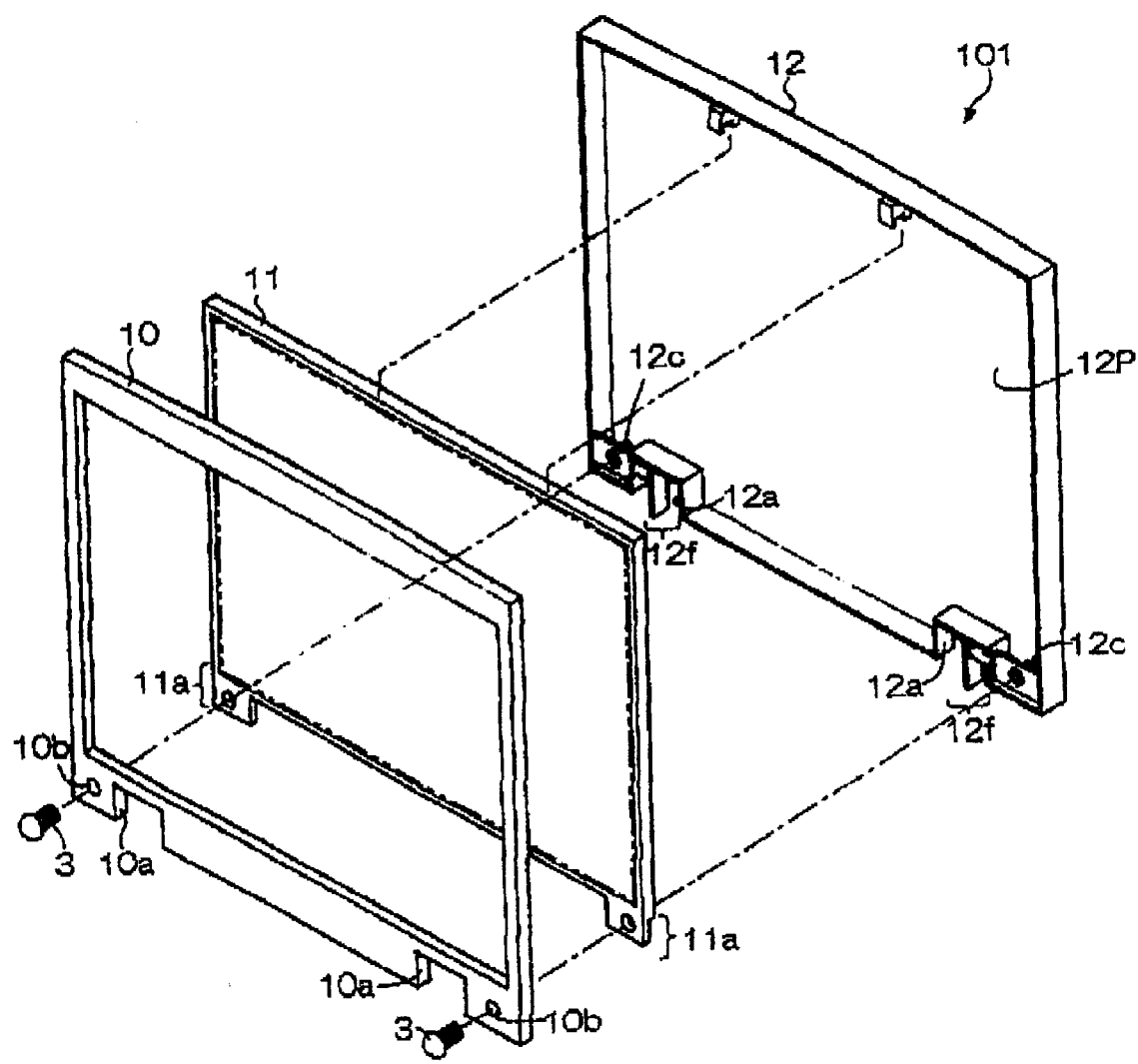
FIG. 15 is a perspective view illustrative of a liquid crystal module mounting structure for mounting a liquid crystal module to a bottom frame of a cover of a personal computer in a fourth embodiment in accordance with the present invention.

A fourth embodiment according to the present invention will be described in detail with reference to the drawings. FIG. 15 is a perspective view illustrative of a liquid crystal module mounting structure for mounting a liquid crystal module to a bottom frame of a cover of a personal computer in a fourth embodiment in accordance with the present invention. A cover 101 of the personal computer comprises a top frame 10, a liquid crystal module 11 and a bottom frame 12. The liquid crystal module 11 is sandwiched between the top frame 10 and the bottom frame 12. The liquid crystal module 11 is mounted to the bottom frame 12. The liquid crystal module 11 has the same structure as shown in FIG. 6 except that the outside frame 5 has two screw hole formation parts 11a which extend from opposite edge portions of a bottom side of the outside frame 5. The detailed descriptions about the structure of the liquid crystal module 11 are eliminated to prevent duplicate descriptions. The top frame 10 has two recessed portions 10a on the bottom side of the top frame 10. The bottom frame 12 has two recessed portions 12a on the bottom side of the bottom frame 12. Each of the recessed portions 12a of the bottom frame 12 is provided with a fixing plate 12f which has an extension portion which cover the boss 12c, wherein the extension portion has a screw hole which correspond to the boss 12c. The recessed portions 10a of the top frame 10 correspond in position to the recessed portions 12a of the bottom frame 12. The bottom frame 2 has a bottom face 12P which has two bosses 12c which extend in a vertical direction to the bottom face 12P. The bottom frame has two fixing parts 12d on the top side of the bottom frame 12. The fixing parts 12 have recessed or grooved portions. The top frame 10 also has two screw holes 10b at corresponding positions to the screw holes of the liquid crystal module 11. The liquid crystal module 11 is aligned to the bottom frame 12 so that the top side of the liquid crystal nodule 11 comes engaged into the recessed or grooved portions of the fixing parts 12d. Subsequently, the screw holes of the liquid crystal module 11 is aligned to the bosses 12c of the bottom frame 12, wherein the screw hole formation regions 11a is fitted to the bosses 12c through the extension portion of the fixing plate 12f in order to secure a large contact area between the screw hole formation regions 11a and the extension portion of the fixing plate 12f, whereby a fixing strength between the liquid crystal module 1 and the bottom frame 12 is increased. Further, the top frame 10 is aligned to the bottom frame 12 so that the screw holes 10b are aligned or correspond to the screw holes of the liquid crystal module 11 and the bosses 12c of the bottom frame 12. Screws 3 are driven in a vertical direction to the surfaces of the top frame, the bottom frame 12 and the liquid crystal module 11. The screws 3 are thus driven from the screw holes 10b of the top frame 10 through the screw holes of the liquid crystal module 11 to the screw holes of the fixing plate 12f and the bosses 2a of the bottom frame 12, whereby the liquid crystal module 11 is mounted or fixed to the bottom frame 12 and the top frame 10 is also mounted or fixed to the bottom frame 12. As a result, the liquid crystal module 11 is sandwiched between the bottom frame 12 and the top frame 10.

The liquid crystal module 11 is moved in a tilting direction from the surface of the bottom frame 12 so that one side edge of the liquid crystal module 11 is inserted into the grooved portions of the fixing parts 12d of the bottom frame 12. The fixing parts 12d may be any one of various shapes as shown in FIGS. 9 and 10A through 10C. The opposite side of the liquid crystal module 11 to the above one side is moved toward the bottom frame 12 in a direction vertical to the surface of the bottom frame, so that the screw holes of the liquid crystal module 11 come together with the screw holes of the fixing plates 12f covering the bosses 12c of the bottom frame 12. The top frame 10 is subsequently aligned to the bottom frame 12 so that the screw holes 10b of the top frame 10 are aligned or correspond to the screw holes of the liquid crystal module 1, the screw holes of the fixing plate 12f and the bosses 12c of the bottom frame 12. The screws 3 are driven in the direction vertical to the surface of the liquid crystal module 11 so that the screws 3 come engaged into the screw holes 10b of the top frame 10, the screw holes of the liquid crystal module 11 and the screw holes of the fixing plate 12f and the bosses 12c of the bottom frame 12, whereby the liquid crystal module 11 is fixed to the bottom frame 12.

The screw hole formation regions 11a is fitted to the bosses 12c through the extension portion of the fixing plate 12f in order to secure a large contact area between the screw hole formation regions 11a and the extension portion of the fixing plate 12f, whereby a fixing strength between the liquid crystal module 1 and the bottom frame 12 is increased.

The liquid crystal module 11 is fixed to the bottom frame 12 by the above described novel mounting or fixing structure, so that the presence of the screw hole formation regions 11a forming the screw holes does never enlarge in size or area of the cover 101, whereby a large ratio in area of the display surface of the liquid crystal module 11 to the cover 101 may be obtained.

The screws 3 are driven in a direction vertical to the surface of the bottom frame 12, for which reason it is convenient to attach the liquid crystal module 11 to the bottom frame 12 and also convenient to remove the liquid crystal module 11 from the bottom frame 12. This makes it easy to assemble the personal computer.

Further, the screw hole formation regions 11a forming the screw holes are positioned in dead spaces of the liquid crystal module 11 so as to provide no influence to the circuits of the liquid crystal module 11, and the screws 3 are driven in a direction vertical to the surface of the bottom frame 12, for which reason the thickness of the cover 101 may be decided on the basis of the thickness of the liquid crystal module 11.

The screws 3 are driven in a direction vertical to the surface of the bottom frame 12, for which reason a high freedom in layout of wiring of the flexible board to the driver circuit mounted on the printed circuit board can be obtained.

It is possible to fix the liquid crystal module 11 to the bottom frame 12 with use of only three or more screws 3 which are not aligned on a single straight line, without using the fixing parts 12d.

In accordance with the above fourth embodiment, the liquid crystal module is fixed to the bottom frame by the above described novel mounting or fixing structure, so that the presence of the screw hole formation regions forming the screw holes does never enlarge in size or area of the cover, whereby a large ratio in area of the display surface of the liquid crystal module to the cover may be obtained.

The screw hole formation regions is fitted to the bosses through the extension portion of the fixing plate in order to secure a large contact area between the screw hole formation regions and the extension portion of the fixing plate, whereby a fixing strength between the liquid crystal module and the bottom frame is increased.

The screws are driven in a direction vertical to the surface of the bottom frame, for which reason it is convenient to attach the liquid crystal module to the bottom frame and also convenient to remove the liquid crystal module from the bottom frame. This makes it easy to assemble the personal computer.

Further, the screw hole formation regions forming the screw holes are positioned in dead spaces of the liquid crystal module so as to provide no influence to the circuits of the liquid crystal module, and the screws are driven in a direction vertical to the surface of the bottom frame, for which reason the thickness of the cover may be decided on the basis of the thickness of the liquid crystal module.

The screws are driven in a direction vertical to the surface of the bottom frame, for which reason a high freedom in layout of wiring of the flexible board to the driver circuit mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Fifth Embodiment

Figure 16:
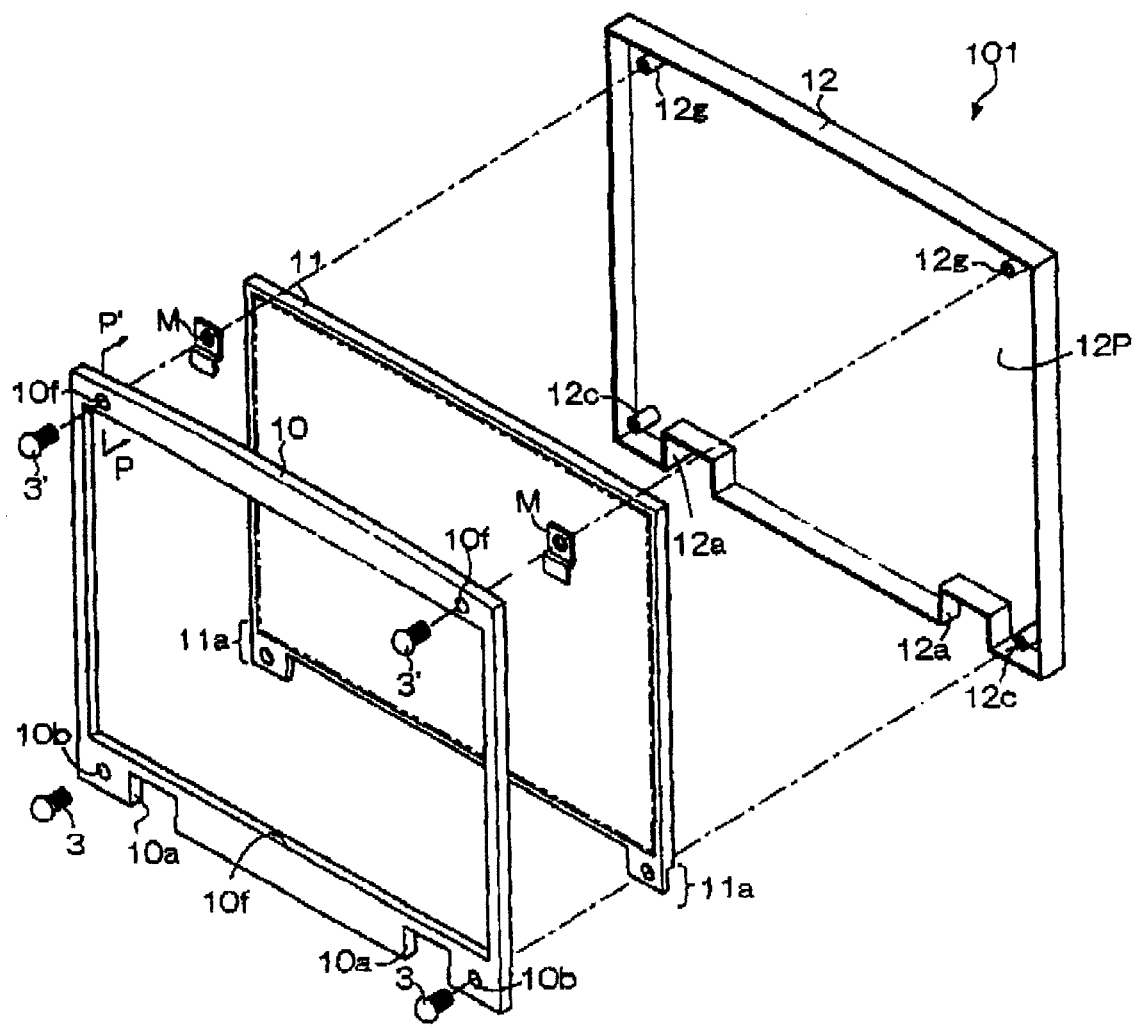
FIG. 16 is a perspective view illustrative of a liquid crystal module mounting structure for mounting a liquid crystal module to a bottom frame of a cover of a personal computer in a fifth embodiment in accordance with the present invention.

A fifth embodiment according to the present invention will be described in detail with reference to the drawings. FIG. 16 is a perspective view illustrative of a liquid crystal module mounting structure for mounting a liquid crystal module to a bottom frame of a cover of a personal computer in a fifth embodiment in accordance with the present invention. A cover 101 of the personal computer comprises a top frame 10, a liquid crystal module 11 and a bottom frame 12. The liquid crystal module 11 is sandwiched between the top frame 10 and the bottom frame 12. The liquid crystal module 11 is mounted to the bottom frame 12. The liquid crystal module 11 has the same structure as shown in FIG. 6 except that the outside frame 5 has two screw hole formation parts 11a which extend from opposite edge portions of a bottom side of the outside frame 5. The detailed descriptions about the structure of the liquid crystal module 11 are eliminated to prevent duplicate descriptions. The top frame 10 has two recessed portions 10a on the bottom side of the top frame 10. The bottom frame 12 has two recessed portions 12a on the bottom side of the bottom frame 12. The recessed portions 10a of the top frame 10 correspond in position to the recessed portions 12a of the bottom frame 12. The bottom frame 2 has a bottom face 12P which has two bosses 12c and two bosses 12g which extend in a vertical direction to the bottom face 12P. The top frame 10 also has two screw holes 10b at corresponding positions to the screw holes of the liquid crystal module 11. The top frame 10 also has two screw holes 10f at corresponding positions to the bosses 12g of the bottom frame 12. In this embodiment, in place of fixing parts, not only the two bosses 12c are provided near the bottom side of the bottom frame 12 but also the bosses 12g are provided near the top side of the bottom frame 12. The top frame 10 also has not only the screw holes 10b corresponding to the bosses 12c of the bottom frame 12 but also the screw holes 10f corresponding to the bosses 12g of the bottom frame 12. The screw holes 10f of the top frame 10 is made into contact through metal members "M" to the bosses 12g of the bottom frame 12. The metal members "M" have L-shaped bent portions which are to be engaged with the top side of the liquid crystal module 1 when the liquid crystal module 1 is sandwiched between the top frame 10 and the bottom frame 12. The liquid crystal module 11 is aligned to the bottom frame 12 so that the screw holes of the liquid crystal module 11 are aligned to the bosses 12c of the bottom frame 12. Further, the top frame 10 is aligned to the bottom frame 12 so that the screw holes 10b of the top frame 10 are aligned or correspond to the screw holes of the liquid crystal module 11 and the bosses 12c of the bottom frame 12, whilst the screw holes 10f of the top frame 10 are aligned or correspond to the screw holes of the metal members "M" and the bosses 12g of the bottom frame 12. Namely, the screw holes 10f of the top frame 10 is made into contact through the screw holes of the metal members "M" to the bosses 12g of the bottom frame 12, whereby the metal members "M" are sandwiched between peripheral portions around the screws 10f of he top frame 10 and the bosses 12g of the bottom frame 12. Simultaneously, the L-shaped bent portions of the metal members "M" are fitted with the top side of the liquid crystal module 11. Since the metal members "M" are fixed between the peripheral portions around the screws 10f of he top frame 10 and the bosses 12g of the bottom frame 12, the L-shaped bent portions of the metal members "M" hold the top side of the liquid crystal module 11. Screws 3 are driven in a vertical direction to the surfaces of the top frame, the bottom frame 12 and the liquid crystal module 11. The screws 3 are thus driven from the screw holes 10b of the top frame 10 through the screw holes of the liquid crystal module 11 to the bosses 12c of the bottom frame 12. Screws 3' are also driven in a vertical direction to the surfaces of the top frame, the bottom frame 12 and the liquid crystal module 11. The screws 3' are thus driven from the screw holes 10f of the top frame 10 through the screw holes of the metal members "M" to the bosses 12c of the bottom frame 12, whereby the metal members "M" are fixed between the peripheral portions around the screws 10f of he top frame 10 and the bosses 12g of the bottom frame 12, the L-shaped bent portions of the metal members "M" hold the top side of the liquid crystal module 11. Therefore, the liquid crystal module 11 is mounted or fixed to the bottom frame 12 and the top frame 10 is also mounted or fixed to the bottom frame 12. As a result, the liquid crystal module 11 is sandwiched between the bottom frame 12 and the top frame 10.

Figure 17:
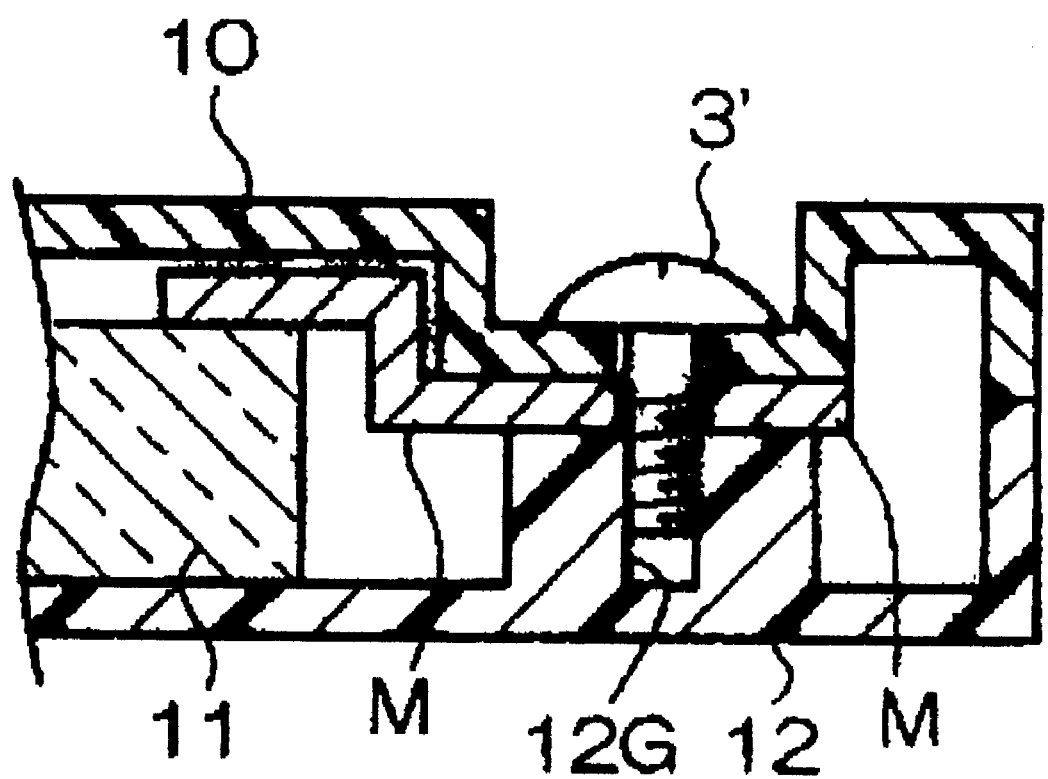
FIG. 17 is a fragmentary cross sectional elevation vie illustrative of a metal member sandwiched between peripheral portions around the screws of he top frame and the bosses of the bottom frame in FIG. 16.

FIG. 17 is a fragmentary cross sectional elevation vie illustrative of a metal member sandwiched between peripheral portions around the screws of he top frame and the bosses of the bottom frame in FIG. 16. The screws 3' are also driven in a vertical direction to the surfaces of the top frame, the bottom frame 12 and the liquid crystal module 11. The screws 3' are thus driven from the screw holes 10f of the top frame 10 through the screw holes of the metal members "M" to the bosses 12c of the bottom frame 12, whereby the metal members "M" are fixed between the peripheral portions around the screws 10f of he top frame 10 and the bosses 12g of the bottom frame 12, the L-shaped bent portions of the metal members "M" hold the top side of the liquid crystal module 11. Therefore, the liquid crystal module 11 is mounted or fixed to the bottom frame 12 and the top frame 10 is also mounted or fixed to the bottom frame 12. As a result, the liquid crystal module 11 is sandwiched between the bottom frame 12 and the top frame 10.

The liquid crystal module 11 is fixed to the bottom frame 12 by the above described novel mounting or fixing structure, so that the presence of the screw hole formation regions 11a forming the screw holes does never enlarge in size or area of the cover 101, whereby a large ratio in area of the display surface of the liquid crystal module 11 to the cover 101 may be obtained.

The screws 3 and 3' are driven in a direction vertical to the surface of the bottom frame 12, for which reason it is convenient to attach the liquid crystal module 11 to the bottom frame 12 and also convenient to remove the liquid crystal module 11 from the bottom frame 12. This makes it easy to assemble the personal computer.

Further, the screw hole formation regions 11a forming the screw holes are positioned in dead spaces of the liquid crystal module 11 so as to provide no influence to the circuits of the liquid crystal module 11, and the screws 3 are driven in a direction vertical to the surface of the bottom frame 12, for which reason the thickness of the cover 101 may be decided on the basis of the thickness of the liquid crystal module 11.

The screws 3 and 3' are driven in a direction vertical to the surface of the bottom frame 12, for which reason a high freedom in layout of wiring of the flexible board to the driver circuit mounted on the printed circuit board can be obtained.

In accordance with the above fifth embodiment, the liquid crystal module is fixed to the bottom frame by the above described novel mounting or fixing structure, so that the presence of the screw hole formation regions forming the screw holes does never enlarge in size or area of the cover, whereby a large ratio in area of the display surface of the liquid crystal module to the cover may be obtained.

The screws are driven in a direction vertical to the surface of the bottom frame, for which reason it is convenient to attach the liquid crystal module to the bottom frame and also convenient to remove the liquid crystal module from the bottom frame. This makes it easy to assemble the personal computer.

Further, the screw hole formation regions forming the screw holes are positioned in dead spaces of the liquid crystal module so as to provide no influence to the circuits of the liquid crystal module, and the screws are driven in a direction vertical to the surface of the bottom frame, for which reason the thickness of the cover may be decided on the basis of the thickness of the liquid crystal module.

The screws are driven in a direction vertical to the surface of the bottom frame, for which reason a high freedom in layout of wiring of the flexible board to the driver circuit mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Sixth Embodiment

Figure 18:
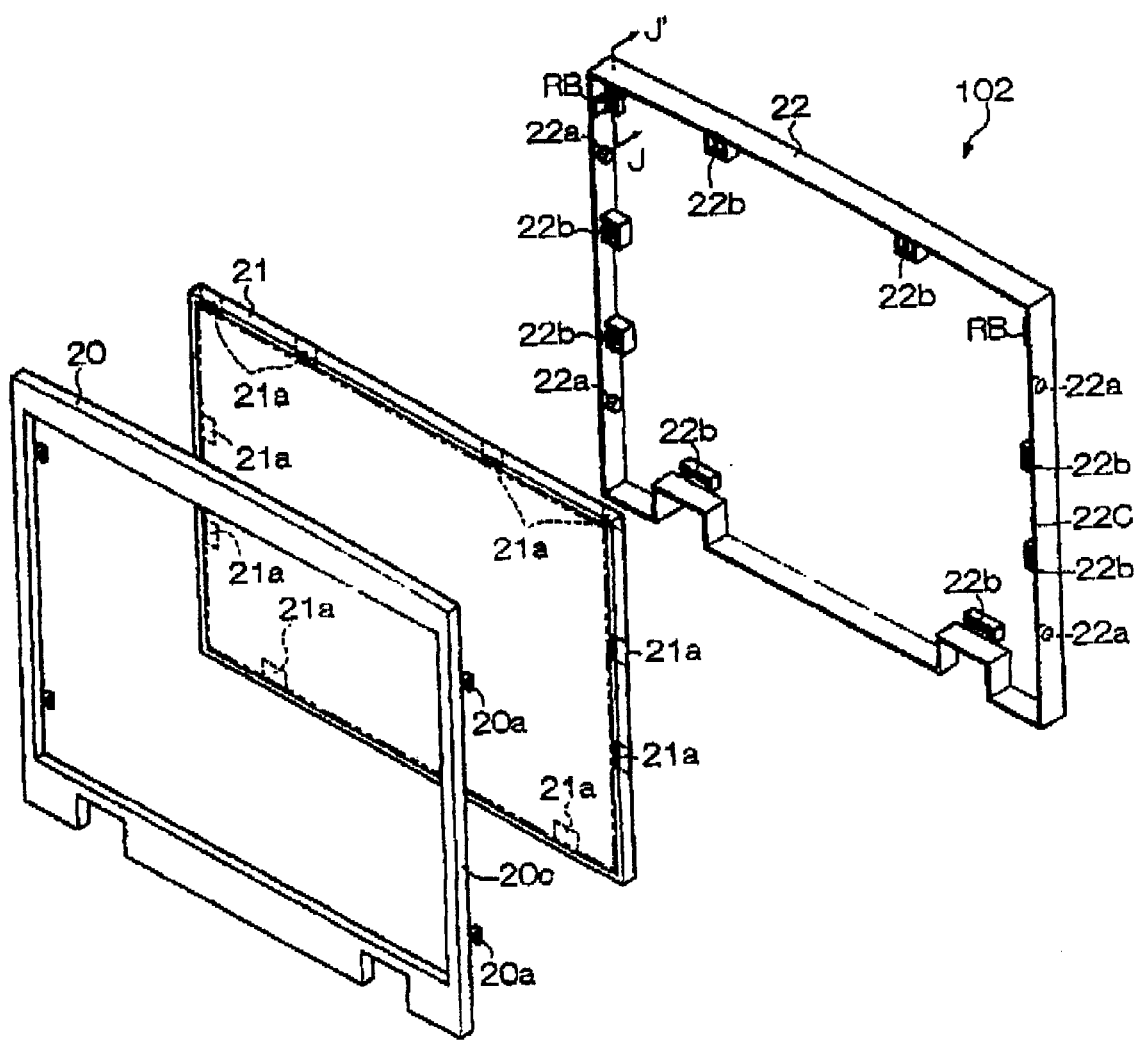
FIG. 18 is a perspective view illustrative of a liquid crystal module mounting structure for mounting a liquid crystal module to a bottom frame of a cover of a personal computer in a sixth embodiment in accordance with the present invention.

A sixth embodiment according to the present invention will be described in detail with reference to the drawings FIG. 18 is a perspective view illustrative of a liquid crystal module mounting structure for mounting a liquid crystal module to a bottom frame of a cover of a personal computer in a sixth embodiment in accordance with the present invention. A cover 102 of the personal computer comprises a top frame 20, a liquid crystal module 21 and a bottom frame 22. The liquid crystal module 21 is sandwiched between the top frame 20 and the bottom frame 22. The liquid crystal module 21 is mounted to the bottom frame 22. The liquid crystal module 21 has the same structure as shown in FIG. 6 except for the following descriptions. The detailed descriptions about the structure of the liquid crystal module 11 are eliminated to prevent duplicate descriptions.

The top frame 20 has opposite side beams 20c, each of which has two hooks 20a. The bottom frame 22 has opposite side beams 22c, each of which has two bosses 22a extending in a direction parallel to the face of the bottom frame 22. The two bosses 22a are positioned to correspond to the hooks 20a of the top frame 20, so that the two bosses 22a are engaged to the hooks 20a of the top frame 20.

The bottom frame 22 has a bottom face 22P. The bottom frame 22 has two rib portions "RB" at two top corners of the bottom frame 22. The bottom frame 22 also has a top side beam on which two ribs 22b are provided. The bottom frame 22 also has a right side beam on which two ribs 22b are provided. The bottom frame 22 also has a left side beam on which two ribs 22b are provided. The bottom frame 22 also has a bottom side beam having two recessed or grooved portions on which two ribs 22b are provided. The top frame 20 also has ribs not illustrated but positioned in correspondence to the rib portions "RB" and the ribs 22b of the bottom frame 22. The liquid crystal module 21 has an outside frame which has ten contact regions 21a which are made into contact with the rib portions "RB" and the ribs 22b of the bottom frame 22 and also contact with the non-illustrated ribs of the top frame 20. Namely, the contact regions 21a of the liquid crystal module 21 are tightly sandwiched between the ribs of the top frame 20 and the bottom frame 22.

Figure 19:
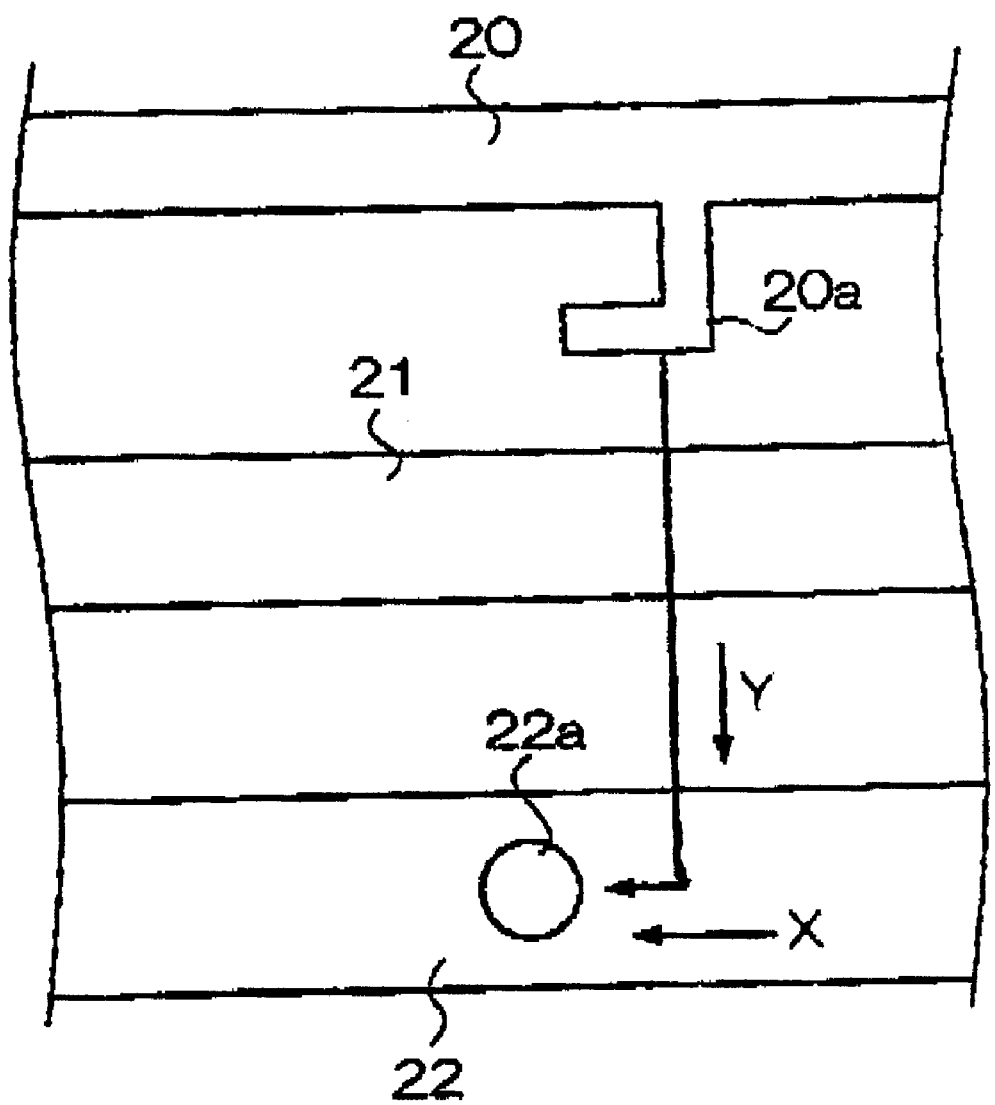
FIG. 19 is a fragmentary schematic view illustrative of alignment of the top frame to the bottom frame shown in FIG. 18.

The top frame 20 and the bottom frame 22 are combined to sandwich the liquid crystal module 21, wherein the hooks 20a of the top frame 20 come engaged into the corresponding bosses 22a of the bottom frame 22. FIG. 19 is a fragmentary schematic view illustrative of alignment of the top frame to the bottom frame shown in FIG. 18. The top frame 20 is moved in a Y-direction so that a position of the hook 20a is made correspond to the boss 2a of the bottom frame 22 before the top frame 20 is moved in an X-direction so that the hook 20a is inserted into the boss 22a, whereby the top frame 20 and the bottom frame 22 are combined to each other so as to sandwich the liquid crystal module 21, wherein the contact regions 21a of the liquid crystal module 21 are tightly sandwiched between the rib portions "RB" and the ribs 22b of the bottom frame 22 and the non-illustrated ribs of the top frame 20.

Figure 20:
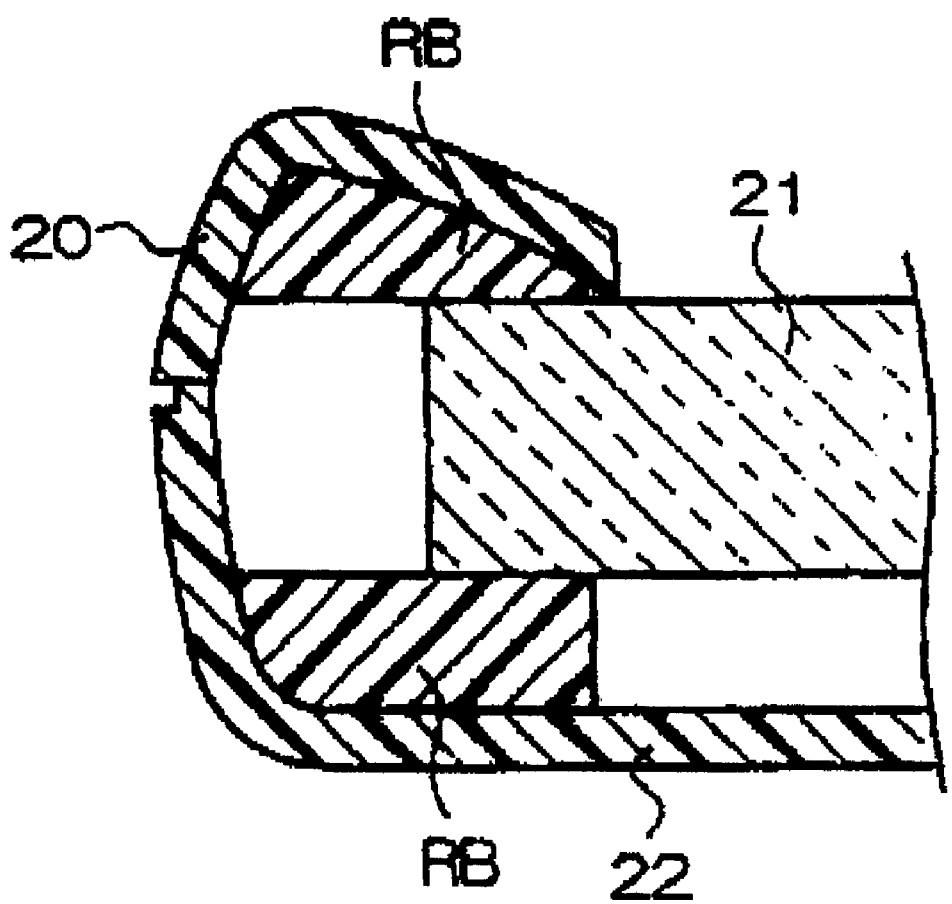
FIG. 20 is a fragmentary cross sectional elevation view illustrative of one corner of the liquid crystal module which is sandwiched between rib portions of the top frame and the bottom frame taken along a J–J' line of FIG. 18.

FIG. 20 is a fragmentary cross sectional elevation view illustrative of one corner of the liquid crystal module which is sandwiched between rib portions of the top frame and the bottom frame taken along a J–J' line of FIG. 18. Each of the two top corners of the liquid crystal module 21 is tightly sandwiched between the rib portions "RB" of the top frame 20 and the bottom frame 22.

It is possible to further provide cushion members or adhesives between the contact regions 21a of the liquid crystal module 21 and the rib portions "RB" and the ribs 22b of the bottom frame 22 to prevent any displacement of the liquid crystal module 21. It is also possible to further provide cushion members or adhesives between the contact regions 21a of the liquid crystal module 21 and the non-illustrated rib portions and the non-illustrated ribs of the top frame 20 to prevent any displacement of the liquid crystal module 21.

The liquid crystal module 21 is fixed to the bottom frame 22 by the above described novel mounting or fixing structure, so that the presence of the rib portions "RB" and the ribs 22b of the bottom frame 22 as well as the presence of the contact regions 21a of the liquid crystal module 21 do never enlarge in size or area of the cover 102, whereby a large ratio in area of the display surface of the liquid crystal module 21 to the cover 102 may be obtained.

The ribs are used to fix the liquid crystal module 21 to the top frame 20 and to the bottom frame 22 without using any screws. This means that no screw holes are required to be formed in the liquid crystal module 21, whereby no damage nor load is applied to the liquid crystal module 21.

Further, the rib portions and the ribs of the top and bottom frames 20 and 22 as well as the contact regions of the liquid crystal module 21 are positioned in dead spaces thereof so as to provide no influence to the circuits of the liquid crystal module 21, for which reason the thickness of the cover 102 may be decided on the basis of the thickness of the liquid crystal module 21.

The rib portions and the ribs of the top and bottom frames 20 and 22 as well as the contact regions of the liquid crystal module 21 are used to fix the liquid crystal module 21 to the top and bottom frames 20 and 22, for which reason a high freedom in layout of wiring of the flexible board to the driver circuit mounted on the printed circuit board can be obtained.

In accordance with the above sixth embodiment, The liquid crystal module is fixed to the bottom frame by the above described novel mounting or fixing structure, so that the presence of the rib portions and the ribs of the bottom frame as well as the presence of the contact regions of the liquid crystal module do never enlarge in size or area of the cover, whereby a large ratio in area of the display surface of the liquid crystal module to the cover may be obtained.

The ribs are used to fix the liquid crystal module to the top frame and to the bottom frame without using any screws. This means that no screw holes are required to be formed in the liquid crystal module, whereby no damage nor load is applied to the liquid crystal module.

Further, the rib portions and the ribs of the top and bottom frames as well as the contact regions of the liquid crystal module are positioned in dead spaces thereof so as to provide no influence to the circuits of the liquid crystal module, for which reason the thickness of the cover may be decided on the basis of the thickness of the liquid crystal module.

The rib portions and the ribs of the top and bottom frames as well as the contact regions of the liquid crystal module are used to fix the liquid crystal module to the top and bottom frames, for which reason a high freedom in layout of wiring of the flexible board to the driver circuit mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Seventh Embodiment

Figure 21:
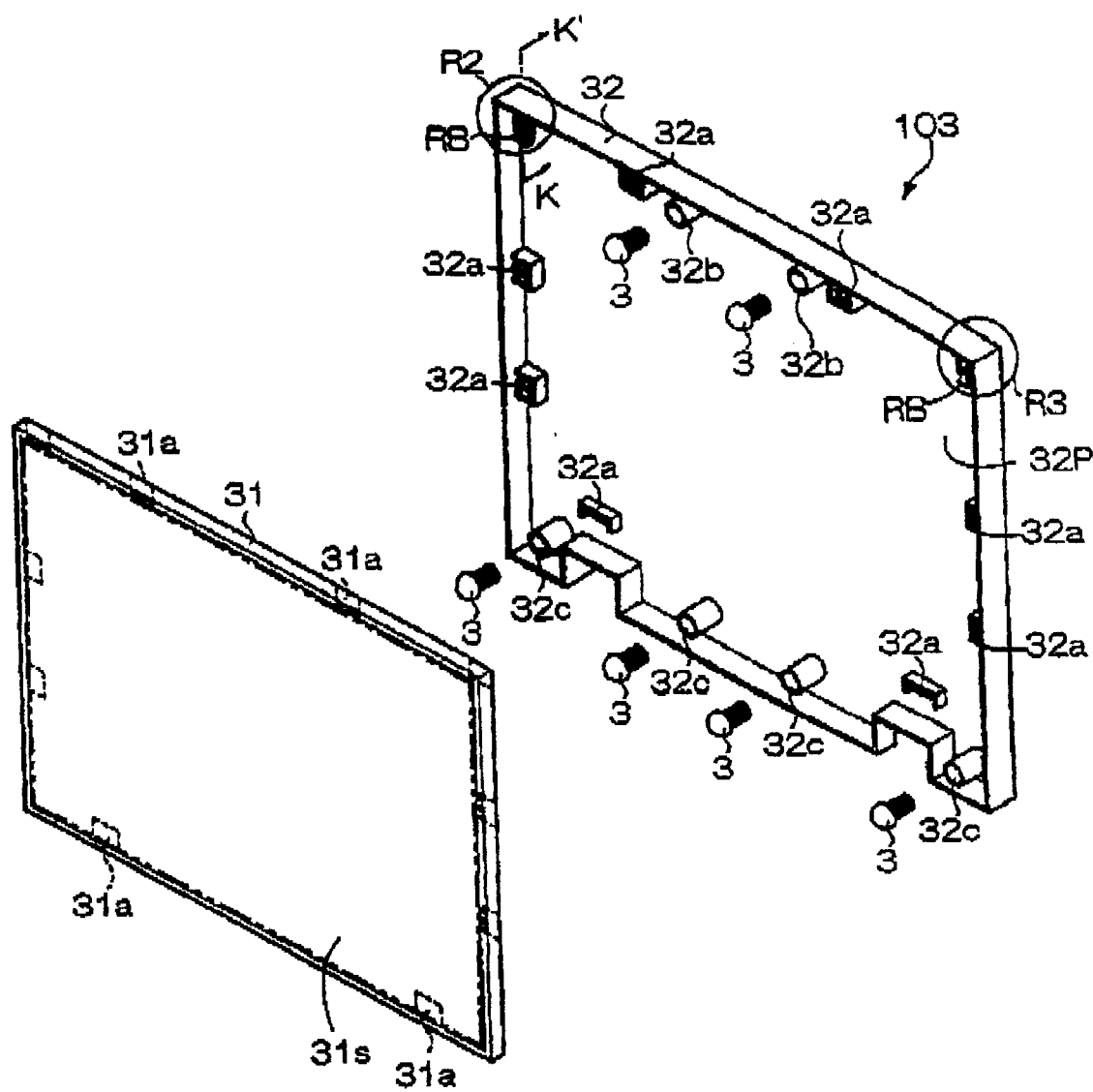
FIG. 21 is a perspective view illustrative of a liquid crystal module mounting structure for mounting a liquid crystal module to a bottom frame of a cover of a personal computer in a seventh embodiment in accordance with the present invention.

A seventh embodiment according to the present invention will be described in detail with reference to the drawings. FIG. 21 is a perspective view illustrative of a liquid crystal module mounting structure for mounting a liquid crystal module to a bottom frame of a cover of a personal computer in a seventh embodiment in accordance with the present invention. A cover 103 of the personal computer comprises a top frame not illustrated, a liquid crystal module 31 and a bottom frame 32. The liquid crystal module 31 is sandwiched between the non-illustrated top frame and the bottom frame 32. The liquid crystal module 31 is mounted to the bottom frame 32. The liquid crystal module 31 has the same structure as shown in FIG. 6 except for the following descriptions. The detailed descriptions about the structure of the liquid crystal module 31 are eliminated to prevent duplicate descriptions.

The bottom frame 32 has two bosses 32c extending in a direction parallel to a bottom face 32P of the bottom frame 32. The two bosses 32c are positioned near the bottom two corners of the bottom frame 32. The bottom frame 32 has two rib portions "RB" at two top corners "R2" and "R3" of the bottom frame 32. The bottom frame 32 also has a top side beam along which two ribs 32a and two bosses 23b are provided. The bottom frame 32 also has a right side beam along which two ribs 32a are provided. The bottom frame 32 also has a left side beam along which two ribs 32a are provided. The bottom frame 32 also has a bottom side beam having two recessed or grooved portions along which two ribs 32a are provided. Four bosses 23c are further provided along the bottom side beam of the bottom frame 32. The liquid crystal module 31 has an outside frame which has ten contact regions 31a which are made into contact with the rib portions "RB" and the ribs 32a of the bottom frame 32 and also contact with the non-illustrated ribs of the top frame 30. Namely, the contact regions 31a of the liquid crystal module 31 are tightly sandwiched between the ribs of the top frame 30 and the bottom frame 32.

Figure 22:
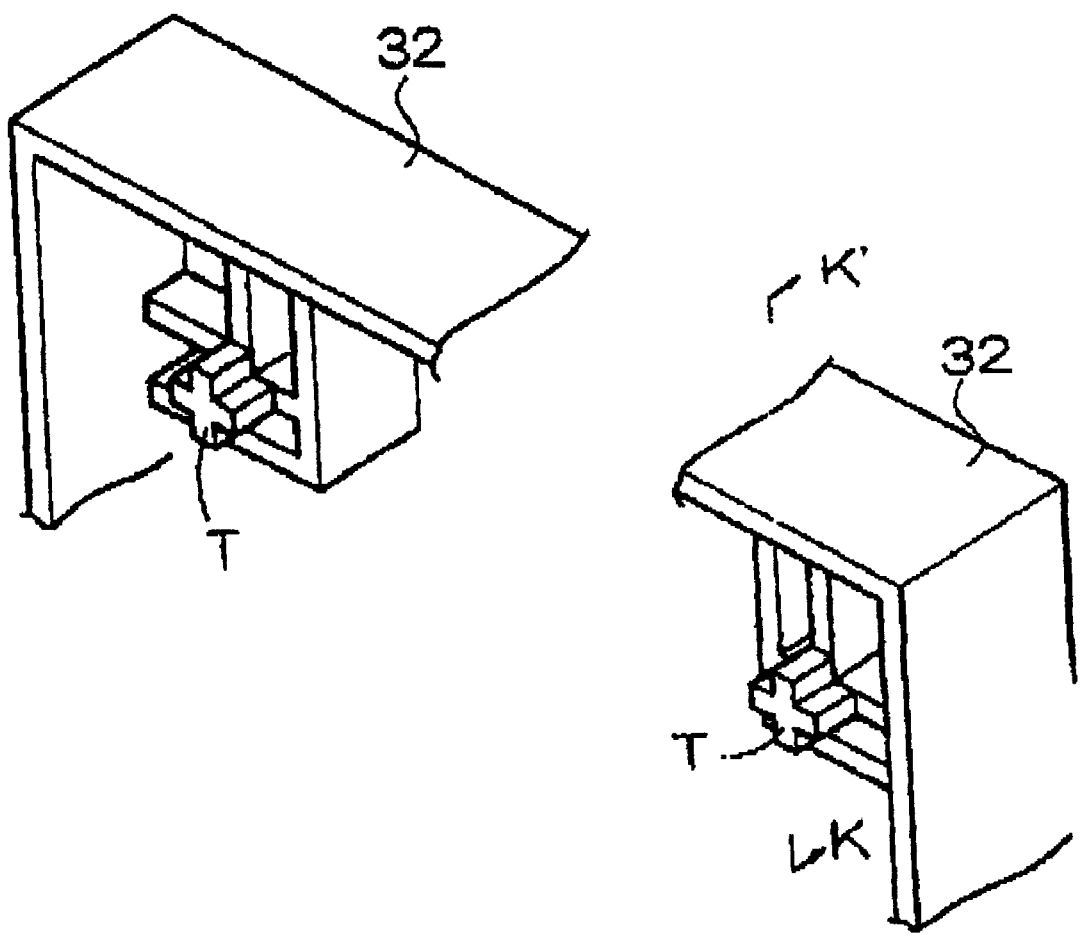
FIG. 22 is a fragmentary schematic view illustrative of alignment of the top frame to the bottom frame shown in FIG. 21.

The top frame 30 and the bottom frame 32 are combined to sandwich the liquid crystal module 31, wherein the hooks 30a of the top frame 30 come engaged into the corresponding bosses 32a of the bottom frame 32. FIG. 22 is a fragmentary schematic view illustrative of tight and left top corners having rib portions "RB" of the bottom frame shown in FIG. 21. The right and left top corners "R3" and "R2" have rib portions "RB". Each of the rib portions "RB" has a cross-shaped projection "T" which projects in a direction perpendicular to the bottom face 32P of the bottom frame 32. The liquid crystal module 31 has cross shaped recessed portions which are not illustrated but at two right and left corners of the liquid crystal modules 31, so that the cross shaped recessed portions of the liquid crystal module 31 correspond in position to the cross-shaped projections "T" of the rib portions "RB" of the bottom frame 32.

Figure 23:
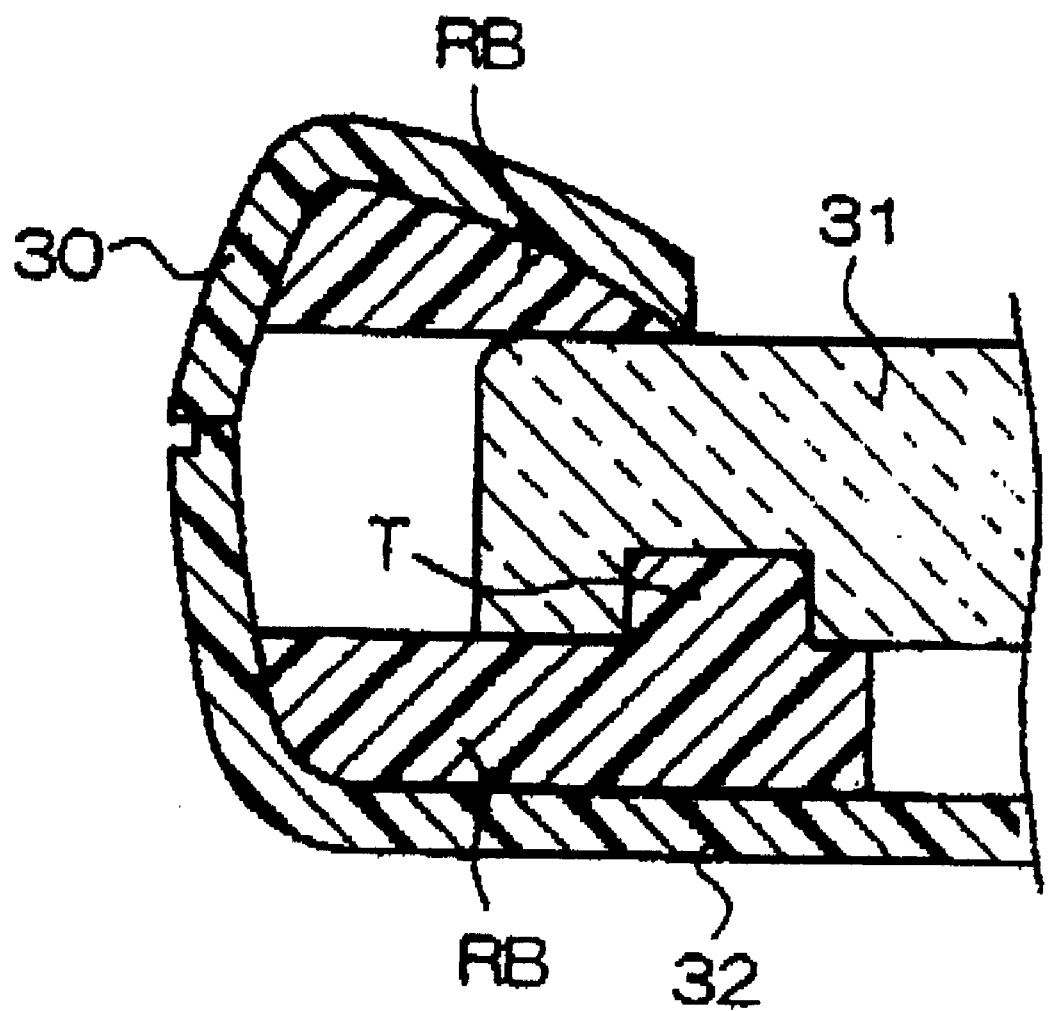
FIG. 23 is a fragmentary cross sectional elevation view illustrative of one corner of the liquid crystal module which is sandwiched between rib portions of the top frame and the bottom frame taken along a K–K' line of FIG. 21.

FIG. 23 is a fragmentary cross sectional elevation view illustrative of one corner of the liquid crystal module which is sandwiched between rib portions of the top frame and the bottom frame taken along a K–K' line of FIG. 22. Each of the two top corners of the liquid crystal module 31 is tightly sandwiched between the rib portions "RB" of the top frame 30 and the bottom frame 32. The cross-shaped projections "T" of the rib portions "RB" of the bottom frame 32 are engaged into the cross shaped recessed portions of the liquid crystal module 31 for securely positioning the liquid crystal module 31 to the top and bottom frames 30 and 32 without any displacement.

With reference back to FIG. 21, the bottom frame 32 has the six bosses 32b. The top frame not illustrated also has six screw holes at positions corresponding to the six bosses 32b of the bottom frame 32, so that the top frame not illustrated is fixed to the bottom frame 32 through screws 3. The screws 3 are driven in a direction vertical to the bottom face 32P of the bottom flame 32 so that the screws 3 are driven from the screw holes of the top frame not illustrated into the bosses 32b of the bottom frame 32. The liquid crystal module 31 is fixed between the top frame 30 and the bottom frame 32 by having the contact regions 31a of the liquid crystal module 31 are toughly sandwiched between the rib portions "RB" and the ribs of the top and bottom frames 30 and 32.

It is possible to further provide cushion members or adhesives between the contact regions 31a of the liquid crystal module 31 and the rib portions "RB" and the ribs 32b of the bottom frame 32 to prevent any displacement of the liquid crystal module 31. It is also possible to further provide cushion members or adhesives between the contact regions 31a of the liquid crystal module 31 and the non-illustrated rib portions and the non-illustrated ribs of the top frame 30 to prevent any displacement of the liquid crystal module 31.

The liquid crystal module 31 is fixed to the bottom frame 32 by the above described novel mounting or fixing structure, so that the presence of the rib portions "RB" and the ribs 32b of the bottom frame 32 as well as the presence of the contact regions 31a of the liquid crystal module 31 do never enlarge in size or area of the cover 103, whereby a large ratio in area of the display surface of the liquid crystal module 31 to the cover 103 may be obtained.

The ribs are used to fix the liquid crystal module 31 to the top frame 30 and to the bottom frame 32 without forming any screws to the liquid crystal module 31. This means that no screw holes are required to be formed in the liquid crystal module 31, whereby no damage nor load is applied to the liquid crystal module 31.

Further, the rib portions and the ribs of the top and bottom frames 30 and 32 as well as the contact regions 31a of the liquid crystal module 31 are positioned in dead spaces thereof so as to provide no influence to the circuits of the liquid crystal module 31, for which reason the thickness of the cover 103 may be decided on the basis of the thickness of the liquid crystal module 31.

The rib portions and the ribs of the top and bottom frames 30 and 32 as well as the contact regions 31a of the liquid crystal module 31 are used to fix the liquid crystal module 31 to the top and bottom frames 20 and 32, for which reason a high freedom in layout of wiring of the flexible board to the driver circuit mounted on the printed circuit board can be obtained.

In accordance with the above seventh embodiment, the liquid crystal module is fixed to the bottom frame by the above described novel mounting or fixing structure, so that the presence of the rib portions and the ribs of the bottom frame as well as the presence of the contact regions of the liquid crystal module do never enlarge in size or area of the cover, whereby a large ratio in area of the display surface of the liquid crystal module to the cover may be obtained.

The ribs are used to fix the liquid crystal module to the top frame and to the bottom frame without using any screws. This means that no screw holes are required to be formed in the liquid crystal module, whereby no damage nor load is applied to the liquid crystal module.

Further, the rib portions and the ribs of the top and bottom frames as well as the contact regions of the liquid crystal module are positioned in dead spaces thereof so as to provide no influence to the circuits of the liquid crystal module, for which reason the thickness of the cover may be decided on the basis of the thickness of the liquid crystal module.

The rib portions and the ribs of the top and bottom frames as well as the contact regions of the liquid crystal module are used to fix the liquid crystal module to the top and bottom frames, for which reason a high freedom in layout of wiring of the flexible board to the driver circuit mounted on the printed circuit board can be obtained.

It is possible to attach any reinforcing member such as a metal plate to each of the top and bottom frames in order to strengthen the liquid crystal module.

As a modification, the above improved mounting structure is applicable for mounting the liquid crystal module to any other devices which use the liquid crystal module as a display such as any other mobile terminals.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An electric apparatus, comprising:

a frame member having at least one hole in a first predetermined location through which a screw can pass from a back side thereof;

a liquid crystal module having a liquid crystal display panel as a front display area and having a back frame allowing said liquid crystal display module to be mounted to said frame member, said back frame including at least one threaded screw hole in a second predetermined location corresponding to said first predetermined location; and at least one screw to fix said liquid crystal module to said frame member by passing through said at least one hole in said frame member from the back side thereof and screwing into said threaded screw hole on said back frame of said liquid crystal module.

2. The electric apparatus of claim 1, further comprising:

at least one spacer through which at least one of said at least one screw passes through to join said liquid crystal module to said frame member.

3. The electric apparatus of claim 2, wherein said at least one spacer comprises a boss provided on a confronting face of said frame member.

* * * * *